United States Patent
Agopsowicz

(10) Patent No.: US 11,425,570 B2
(45) Date of Patent: Aug. 23, 2022

(54) APPARATUS AND METHOD FOR GENERATING NON-STANDARD PREAMBLE PATTERN BASED ON PROXIMITY TO NETWORK

(71) Applicant: Innocordia LLC, Alexandria, VA (US)

(72) Inventor: Doug Agopsowicz, Alexandria, VA (US)

(73) Assignee: Doug Agopsowicz, Alexandria, VA (US)

( * ) Notice: Subject to any disclaimer, the term of this patent is extended or adjusted under 35 U.S.C. 154(b) by 407 days.

(21) Appl. No.: 16/566,382

(22) Filed: Sep. 10, 2019

(65) Prior Publication Data

US 2021/0076200 A1    Mar. 11, 2021

(51) Int. Cl.
| | |
|---|---|
| H04W 12/00 | (2021.01) |
| H04W 12/37 | (2021.01) |
| H04W 4/80 | (2018.01) |
| H04L 41/12 | (2022.01) |
| H04W 76/10 | (2018.01) |
| H04W 12/037 | (2021.01) |
| H04W 12/67 | (2021.01) |

(52) U.S. Cl.
CPC ............. *H04W 12/37* (2021.01); *H04L 41/12* (2013.01); *H04W 4/80* (2018.02); *H04W 12/037* (2021.01); *H04W 12/67* (2021.01); *H04W 76/10* (2018.02)

(58) Field of Classification Search
CPC ..... H04W 12/37; H04W 4/80; H04W 12/037; H04W 12/67; H04W 76/10; H04W 12/03; H04W 12/63; H04L 41/12; H04L 69/22
See application file for complete search history.

(56) References Cited

U.S. PATENT DOCUMENTS

| | | | |
|---|---|---|---|
| 5,920,698 A * | 7/1999 | Ben-Michael | H04L 29/06 709/224 |
| 6,771,720 B1 | 8/2004 | Yang et al. | |
| 7,003,063 B2 | 2/2006 | Mill | |
| 7,035,350 B2 | 4/2006 | Yuan et al. | |
| 7,120,206 B2 | 10/2006 | Schetelig et al. | |

(Continued)

OTHER PUBLICATIONS

Bluetooth Core Specification, v5.1, published Jan. 21, 2019, available at https://www.bluetooth.com/specifications/bluetooth-core-specification/ (see pp. 428-429, 2691-2692).

*Primary Examiner* — Abu S Sholeman

(57) ABSTRACT

A wireless apparatus includes a physical housing, communication circuitry provided in the physical housing, a transmission data inputter provided on the physical housing, and a transmission data generator provided in the physical housing, the transmission data generator including a proximity analyzer configured to detect whether the wireless apparatus is within range of a network; a non-standard preamble pattern generator configured to selectively generate, based on whether the proximity analyzer detects that the wireless apparatus is within range of the network, a data packet preamble having a non-standard preamble pattern in which at least two bits that are adjacent to each other within a series of bits have a same value as each other, and a packet encoder configured to generate data packets including the data packet preamble having the non-standard preamble pattern and raw transmission data.

16 Claims, 11 Drawing Sheets

(56) References Cited

U.S. PATENT DOCUMENTS

| | | |
|---|---|---|
| 7,453,853 B2 | 11/2008 | Haartsen |
| 7,697,895 B2 | 4/2010 | Grundvig et al. |
| 8,599,824 B2 | 12/2013 | Walley et al. |
| 9,973,534 B2 | 5/2018 | Mahaffey et al. |
| 10,070,399 B2 | 9/2018 | Nan et al. |
| 10,264,459 B2 | 4/2019 | Dinan |
| 2012/0307676 A1 | 12/2012 | Chan et al. |
| 2013/0028152 A1* | 1/2013 | Kim ............... H04W 88/08 370/310 |
| 2016/0292464 A1 | 10/2016 | Alarabi |
| 2018/0176009 A1* | 6/2018 | Agerstam ............ H04L 67/16 |
| 2018/0293389 A1 | 10/2018 | Mahaffey et al. |
| 2019/0190765 A1 | 6/2019 | Murali et al. |

* cited by examiner

FIG. 6
(a)
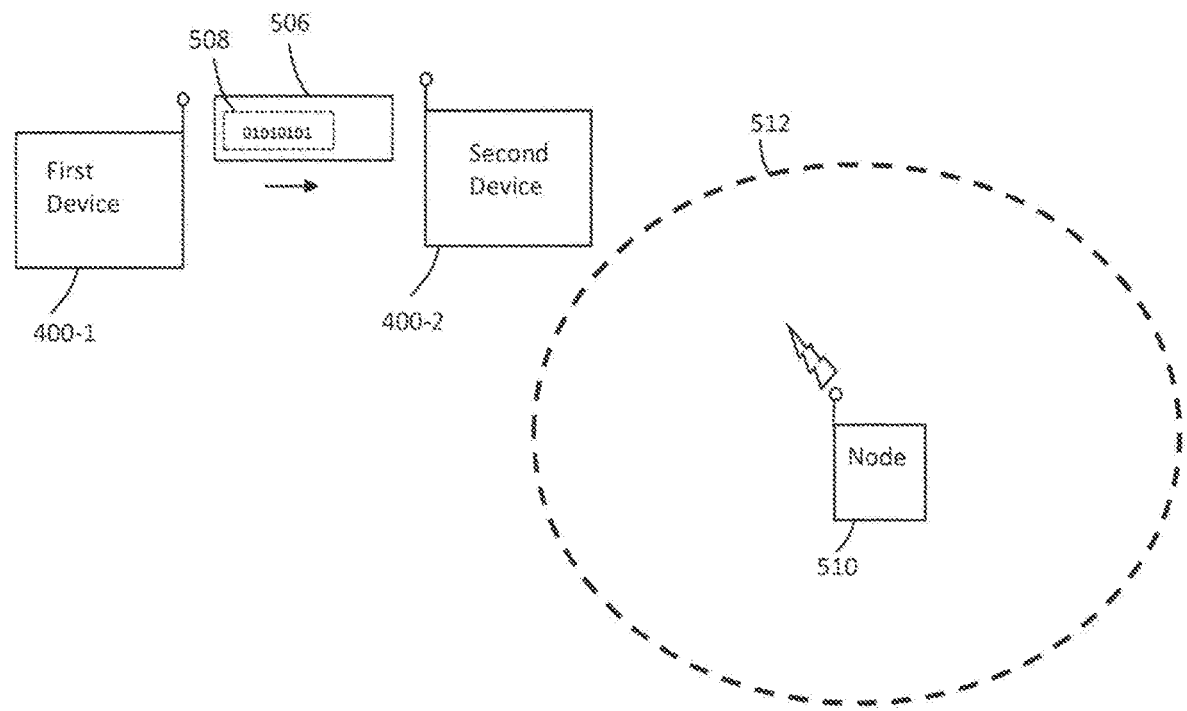
(b)
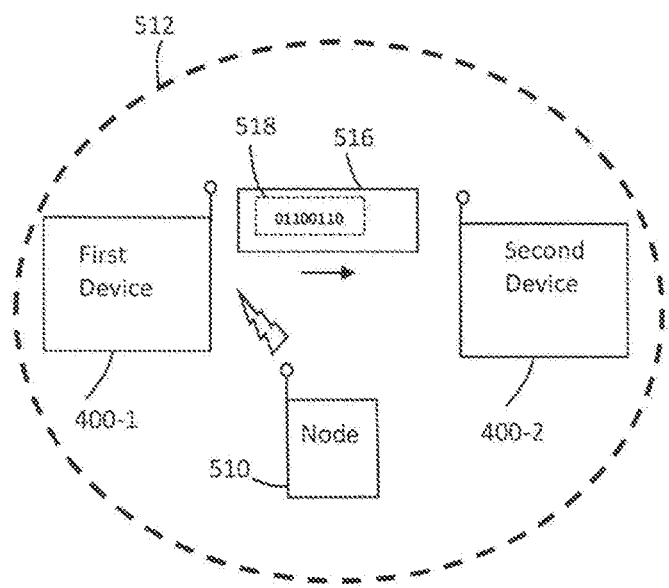

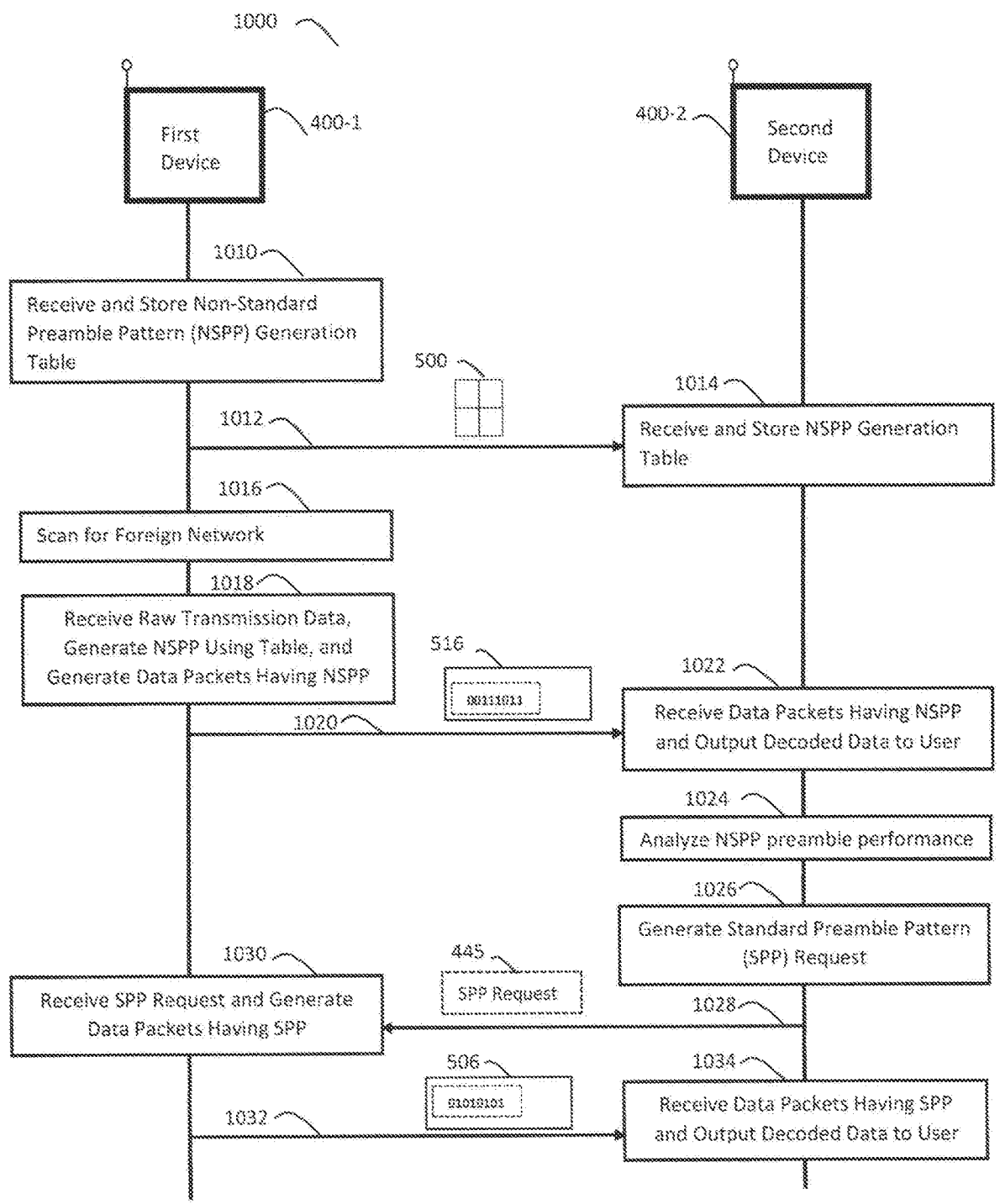

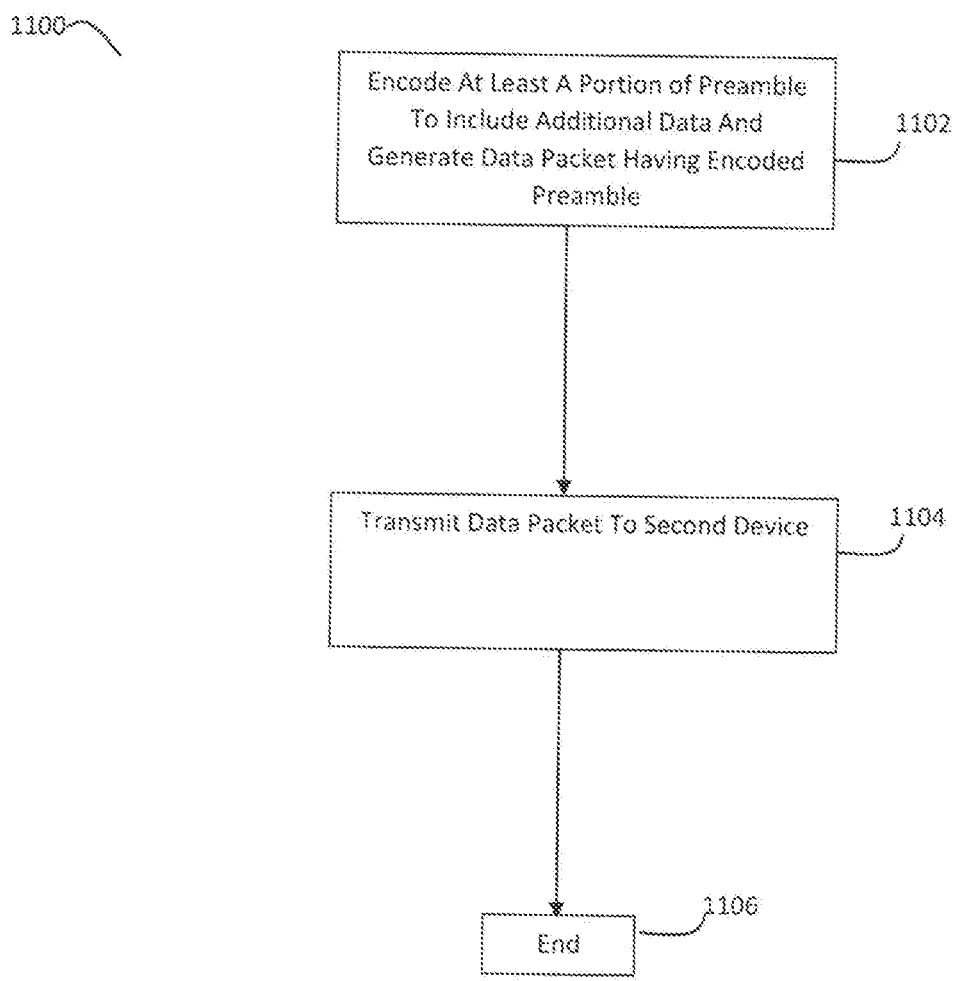

APPARATUS AND METHOD FOR GENERATING NON-STANDARD PREAMBLE PATTERN BASED ON PROXIMITY TO NETWORK

BACKGROUND

1. Field

Exemplary embodiments disclosed herein relate to methods and apparatuses for generating a non-standard preamble pattern, and more particularly, relate to methods and apparatuses for generating data packets including preambles having non-standard preamble patterns based on the proximity of a user device to a network.

2. Description of the Related Art

In recent years, the use of wireless technology has proliferated. As a result of technological advancements, users of wireless devices are now able to connect wireless devices together to achieve various types of communication functions. For example, a busy professional may wear a headset that wirelessly connects with a smartphone, to enhance teleconferencing abilities while on the go. As another example, an athlete may connect an exercise device, such as a fitbit or smartwatch, to a smartphone to track his or her athletic performance. As yet another example, a student or office worker may wirelessly connect his or her laptop to various types of peripheral devices, such as a wireless keyboard, mouse, printer, smartphone, or other device, to improve productivity and enhance ergonomics. Technology companies are constantly developing additional ways to combine the functionalities of wireless communication devices.

A very popular short-range wireless communication technology is BLUETOOTH. BLUETOOTH is commonly used to connect smartphones or laptops to other electronic devices such as headsets, watches, automobiles, video game systems, home security devices, appliances, and other electronic devices. In addition to BLUETOOTH, technology companies have also been developing and refining other wireless communication technology standards for some time, such as the IEEE 802.11 family of standards (commonly referred to as Wi-Fi), Zigbee, and other wireless communication standards.

As the use of wireless communication technologies has increased, hackers have developed increasingly sophisticated techniques to access confidential information of wireless users. Hackers currently employ a myriad of different hacking techniques, including active hacking techniques, such as brute force attacks, along with passive hacking techniques, such as eavesdropping techniques. For example, a hacker may employ an eavesdropping attack referred to as a Man-in-the-Middle Attack to steal private information of a wireless user, such as login credentials, financial information, and other sensitive information. To perpetrate a Man-in-the-Middle Attack on a Wi-Fi network, a hacker typically waits in an area with free public Wi-Fi, such as a coffee shop. When an unsuspecting user attempts to connect to the Wi-Fi hotspot, the hacker gains access to the data exchange between the user and the Wi-Fi hotspot. Similarly, hackers may also use Man-in-the-Middle Attacks and other types of attacks to hack into BLUETOOTH data exchanges and other types of data exchanges. Furthermore, hackers also utilize a myriad of other hacking techniques as well. Unsuspecting users are particularly at risk when they enter a public area having wireless network connectivity, such as a coffee shop, sporting event, store, or other public place, because such public areas tend to have low or no wireless security and also tend to have crowds of people which enable hackers to blend in.

FIG. 1 illustrates an example of an eavesdropping hacking technique to hack into a data exchange. As shown in FIG. 1, a user carries two wireless devices including a primary device 110 (e.g., master) and a peripheral device 112 (e.g., slave) that are wirelessly connected to each other. For example, the primary device 110 may be a smartphone, and the peripheral device 112 may be a wireless headset. The primary device 110 and peripheral device 112 are connected by a BLUETOOTH network 108 (also referred to as a piconet) established therebetween, and exchange data packets 114 via the BLUETOOTH network 108. The user walks into a public area, such as a coffee shop, that has a first node 104 which establishes a Wi-Fi network 102. A hacker 116 also located in the coffee shop detects the data exchange between the primary device 110 and the peripheral device 112 and begins the hack into the BLUETOOTH data exchange.

In order to initially detect the BLUETOOTH data exchange, the hacker 116 needs to monitor the data format of the data packets 114. To monitor the format of the data packets 114, hackers may utilize various types of hardware designed to monitor and communicate on the BLUETOOTH network, such as, for example, an apparatus that employs a NORDIC semiconductor system on chip (SoC). Using such hardware, an experienced hacker familiar with the different major wireless telecommunication standards can easily identify the format of the data packets 114, including whether the data packets 114 are being transmitted via BLUETOOTH, Wi-Fi, or some other protocol. With respect to the BLUETOOTH data structure in particular, a BLUETOOTH data packet has several parts including a first part called a preamble. The preamble is positioned at the beginning of each data packet and has a standardized format of alternating bits that alternate between 0 and 1 for a predetermined length. Since the preamble of a BLUETOOTH data packet is always an alternating pattern of 0s and 1s and always has a known predetermined length, the hacker 116 can very easily confirm that the data packets 114 conform to the BLUETOOTH standard. In practice, the technique of detecting a preamble is informally referred to a "preamble sniff". Upon detecting the BLUETOOTH data exchange, the hacker 116 may then, for example, perpetrate an eavesdropping attack against the primary device 110 and peripheral device 112 as shown in FIG. 1, thus compromising the user's personal information stored in the primary device 110 and/or peripheral device 112.

Thus, there is currently a significantly security problem in that hackers can easily identify a user's BLUETOOTH data exchange by detecting the preamble of the user's data packets using a preamble sniff.

U.S. Pat. No. 9,973,534 B2 to Mahaffey discloses a technique of collecting context information associated with a first type of network connection between a mobile communication device and a remote destination, applying a security policy using the collected context information, and based on the application of the security policy, determining whether there should be a second type of network connection established between the mobile communications device and the remote destination. If the security offered by the first network connection is not appropriate for the context, the network connection may be made more secure, less secure, or a different network connection having an appropriate level of security may be used. However, although Mahaffey discloses changing network connections based on context information and security policies, Mahaffey does not mention anything at all about preventing hackers from detecting the preambles of data packets.

U.S. Pat. No. 10,264,459 B2 to Dinan discloses an automobile device that transmits data to a server in a communication network. The automobile device transmits a random access preamble on an uplink carrier to a base station when a predefined condition is met, where the random access preamble may be generated based on a Zadoff-Chu sequence or Gold sequence. The automobile device then receives a time alignment command from the base station and transmits data destined for the server to the base station. However, the technique of Dinan is directed towards transmitting data from an automobile to a base station using cellular communication technology, which is significantly different from preventing preamble detection in a peer-to-peer environment. Moreover, Dinan does not address the security problem that hackers can use a preamble sniff to detect certain types of data packets, and thus does not disclose any mechanism for solving such a problem.

U.S. Pat. No. 6,771,720 B1 to Yang discloses an amplification control scheme for a receiver to reliably demodulate a received signal including a preamble. However, although the technique of Yang improves the ability to reliably receive and demodulate a preamble, Yang does not disclose any mechanism to prevent hackers from detecting preambles of data packets.

Thus, there is a significant need for a technique to prevent hackers from detecting BLUETOOTH data exchanges using a preamble sniff.

Moreover, there is a significant need to utilize a data preamble in a more secure and efficient fashion.

SUMMARY

Exemplary embodiments disclosed herein relate to a method and apparatus for ensuring that hackers cannot detect data preambles during a user's data exchange, to thereby enhance wireless telecommunications security.

Exemplary embodiments disclosed herein further relate to a method and apparatus for analyzing the performance of a data preamble and determining whether to use a standard data preamble pattern or a non-standard date preamble pattern based on the analyzed performance.

Exemplary embodiments disclosed herein further relate to a method and apparatus for encoding information into a data preamble to increase functionality of the data preamble.

According to an aspect of an exemplary embodiment, there is provided a wireless apparatus, including: a physical housing; communication circuitry provided in the physical housing, the communication circuitry including: a first network module including a first network module antenna, the first network module configured to transmit and receive, via the first network module antenna, data conforming to a first telecommunications data standard over a first network established between the wireless apparatus and another wireless apparatus, and a second network module including a second network module antenna, the second network module configured to transmit and receive, via the second network module antenna, data conforming to a second telecommunications data standard over a second network; a transmission data inputter provided on the physical housing, the transmission data inputter configured to receive raw transmission data input from a user; and a transmission data generator provided in the physical housing, the transmission data generator configured to generate data packets to be transmitted to the other wireless apparatus via the first network module based on the raw transmission data, the transmission data generator including: a proximity analyzer configured to detect whether the wireless apparatus is within range of the second network; a non-standard preamble pattern generator configured to selectively generate, based on whether the proximity analyzer detects that the wireless apparatus is within range of the second network, a data packet preamble having a non-standard preamble pattern in which at least two bits that are adjacent to each other within a series of bits have a same value as each other; and a packet encoder configured to generate the data packets including the data packet preamble having the non-standard preamble pattern and the raw transmission data, and to transfer the generated data packets to the first network module for transmission to the other wireless apparatus.

The packet encoder may be further configured to generate a standard preamble pattern including a series of bits that strictly alternate in value throughout the entire preamble pattern, where the non-standard preamble pattern generator generates the non-standard preamble pattern in response to detecting that the wireless apparatus is within the range of the second network, and the packet encoder generates the standard preamble pattern in response to detecting that the wireless apparatus is outside of the range of the second network.

The wireless apparatus may further include a hardware memory provided in the physical housing; wherein the hardware memory stores a non-standard preamble pattern generation table including a list of scenarios regarding types of second networks and a corresponding list of non-standard preamble pattern generation techniques to be used to generate the non-standard preamble pattern, and wherein, in response to the proximity analyzer detecting that the wireless apparatus is within range of the second network, the non-standard preamble pattern generator analyzes the detected second network to determine which one of the scenarios in the non-standard preamble pattern generation table matches the detected second network, accesses the non-standard preamble pattern generation table from the hardware memory, selects a non-standard preamble pattern generation technique corresponding to the scenario matching the detected second network from among the non-standard preamble pattern generation techniques stored in the hardware memory, and generates the non-standard preamble pattern based on the selected non-standard preamble pattern generation technique.

The non-standard preamble pattern generation table may include: a first scenario in which the detected second network is untrusted, a security level of an application being currently executed by the wireless apparatus is a low security level, and a corresponding non-standard preamble pattern generation technique is a first technique providing a first level of security; a second scenario in which the detected second network is untrusted, the security level of the application being currently executed by the wireless apparatus is a medium security level that is higher than the low security level, and a corresponding non-standard preamble pattern generation technique is a second technique providing a second level of security higher than the first level of security; and a third scenario in which the detected second network is untrusted, the security level of the application being currently executed by the wireless apparatus is a high security level that is higher than the medium security level, and a corresponding non-standard preamble pattern generation technique is a third technique providing a third level of security higher than the second level of security.

The first technique may use a fixed sequence as the non-standard preamble pattern, the second technique may use information related to a previous network visited by the wireless apparatus to generate the non-standard preamble pattern, and the third technique may use an encryption algorithm to generate the non-standard preamble pattern.

The wireless apparatus may further include: a reception data receiver provided in the physical housing, the reception data receiver configured to receive reception data packets each including a data packet preamble having another non-standard preamble pattern from the other wireless apparatus via the first network, the reception data receiver including: a reception data parser configured to parse information from the other non-standard preamble pattern; a standard preamble pattern request generator configured to selectively generate a request which requests the other wireless apparatus to use the standard preamble pattern, based on the parsed information; a packet decoder configured to decode the reception data packets; and a reception data outputter configured to output the decoded reception data packets.

The information parsed by the reception data parser may include at least one of frequency information, symbol timing information, and automatic gain control (AGC) information, and the reception data receiver may further include: a frequency analyzer configured to analyze the frequency information and thereby determine whether the other non-standard preamble pattern is achieving frequency synchronization that falls within an acceptable predetermined range, and if not, to determine a magnitude of deviation of the frequency synchronization beyond the acceptable predetermined range; a symbol timing analyzer configured to analyze the symbol timing information and thereby determine whether the other non-standard preamble pattern is achieving symbol timing that falls within an acceptable predetermined range, and if not, to determine a magnitude of deviation of the symbol timing beyond the acceptable predetermined range; and an AGC analyzer configured to analyze the AGC information and thereby determine whether the other non-standard preamble pattern is achieving symbol timing AGC that falls within an acceptable predetermined range, and if not, to determine a magnitude of deviation of the AGC beyond the acceptable predetermined range, and the standard preamble pattern request generator may generate the request based on analysis results from the frequency analyzer, the symbol timing analyzer, and the AGC analyzer.

The standard preamble pattern request generator may assign weights to the analysis results from the frequency analyzer, the symbol timing analyzer, and the AGC analyzer, such that at least one of the analysis results is weighted heavier than at least one other analysis result.

The first network may be a BLUETOOTH piconet established between the wireless apparatus and the other wireless apparatus, and the second network may be a Wi-Fi network.

The first network may be a BLUETOOTH Low Energy (LE) network.

According to an aspect of another exemplary embodiment, there is provided a method of generating a non-standard preamble pattern to be included in data packets to be transmitted from a wireless apparatus to another wireless apparatus via a first network conforming to a first telecommunications data standard, the method being performed by the wireless apparatus and including: receiving, via a transmission data inputter provided on a physical housing of the wireless apparatus, raw transmission data input from a user; detecting, via a proximity analyzer provided in the physical housing of the wireless apparatus, whether the wireless apparatus is within range of a second network conforming to a second telecommunications data standard; selectively generating, via a non-standard preamble pattern generator provided in the physical housing, a data packet preamble having a non-standard preamble pattern in which at least two bits that are adjacent to each other within a series of bits have a same value as each other, based on whether the detecting indicates that the wireless apparatus is within range of the second network; and generating, via a packet encoder provided in the physical housing, the data packets including the data packet preamble having the non-standard preamble pattern and the raw transmission data, and transmitting the generated data packets to the other wireless apparatus.

The selectively generating may include: generating, via the non-standard preamble pattern generator, the non-standard preamble pattern in response to detecting that the wireless apparatus is within the range of the second network; and generating, via the packet encoder, a standard preamble pattern including a series of bits that strictly alternate in value throughout the entire preamble pattern in response to detecting that the wireless apparatus is outside of the range of the second network.

The method may further include: storing, in a hardware memory provided in the physical housing, a non-standard preamble pattern generation table including a list of scenarios regarding types of second networks and a corresponding list of non-standard preamble pattern generation techniques to be used to generate the non-standard preamble pattern; and in response to the detecting indicating that the wireless apparatus is within range of the second network: analyzing the detected second network to determine which one of the scenarios in the non-standard preamble pattern generation table matches the detected second network, accessing the non-standard preamble pattern generation table from the hardware memory, selecting a non-standard preamble pattern generation technique corresponding to the scenario matching the detected second network, and generating the non-standard preamble pattern based on the selected non-standard preamble pattern generation technique.

The method may further include: parsing, from reception data packets transmitted from the other wireless apparatus via the first network and each including a data packet preamble having another non-standard preamble pattern, information from the other non-standard preamble pattern; selectively generating, via a standard preamble pattern request generator, a request which requests the other wireless apparatus to use the standard preamble pattern, based on the parsed information; decoding the reception data packets; and outputting the decoded reception data packets.

The parsing may include parsing at least one of frequency information, symbol timing information, and automatic gain control (AGC) information from the reception data packets, and wherein the method further includes: analyzing the frequency information and thereby determining whether the other non-standard preamble pattern is achieving frequency synchronization that falls within an acceptable predetermined range, and if not, determining a magnitude of deviation of the frequency synchronization beyond the acceptable predetermined range; analyzing the symbol timing information and thereby determining whether the other non-standard preamble pattern is achieving symbol timing that falls within an acceptable predetermined range, and if not, determining a magnitude of deviation of the symbol timing beyond the acceptable predetermined range; analyzing the AGC information and thereby determining whether the other non-standard preamble pattern is achieving AGC that falls within an acceptable predetermined range, and if not, determining a magnitude of deviation of the AGC beyond the acceptable predetermined range; and generating the request based on the analyzing of the frequency information, the symbol timing information, and the AGC information.

The method may further include assigning weights to analysis results from the frequency analyzer, the symbol timing analyzer, and the AGC analyzer, such that at least one of the analysis results is weighted heavier than at least one other result.

The first network may be a BLUETOOTH piconet established between the wireless apparatus and the other wireless apparatus, and the second network may be a Wi-Fi network.

The first network may be a BLUETOOTH Low Energy (LE) network.

According to an aspect of another exemplary embodiment, there is provided a wireless apparatus, including: a physical housing; communication circuitry provided in the physical housing, the communication circuitry including a network module including a network module antenna, the network module configured to transmit and receive, via the network module antenna, data conforming to a telecommunications data standard used to establish a network between the wireless apparatus and another wireless apparatus, a transmission data generator provided in the physical housing, the transmission data generator configured to generate data packets to be transmitted to the other wireless apparatus via the network module, the transmission data generator including: a non-standard preamble pattern generator configured to generate a data packet preamble having a non-standard preamble pattern in which at least two bits that are adjacent to each other within a series of bits have a same value as each other; and a packet encoder configured to generate the data packets including the data packet preamble having the non-standard preamble pattern and raw transmission data, and to transfer the generated data packets to the network module for transmission to the other wireless apparatus, wherein the non-standard preamble pattern generator uses an encryption algorithm to encode the non-standard preamble pattern with additional data to be transmitted to the other wireless apparatus.

The additional data may include information regarding one of user payload data, information regarding inquiry, scan, or paging functionality of the wireless apparatus, environmental information, device information, battery information, or security information.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which:

FIG. 6 illustrates an example environment in which the wireless apparatus shown in FIG. 4 can be used;

FIG. 10 illustrates a message flow in a system including two of the wireless apparatuses according to an exemplary embodiment; and FIG. 11 illustrates a method of encoding a preamble to include additional data according to another exemplary embodiment.

DETAILED DESCRIPTION

Figure 1:
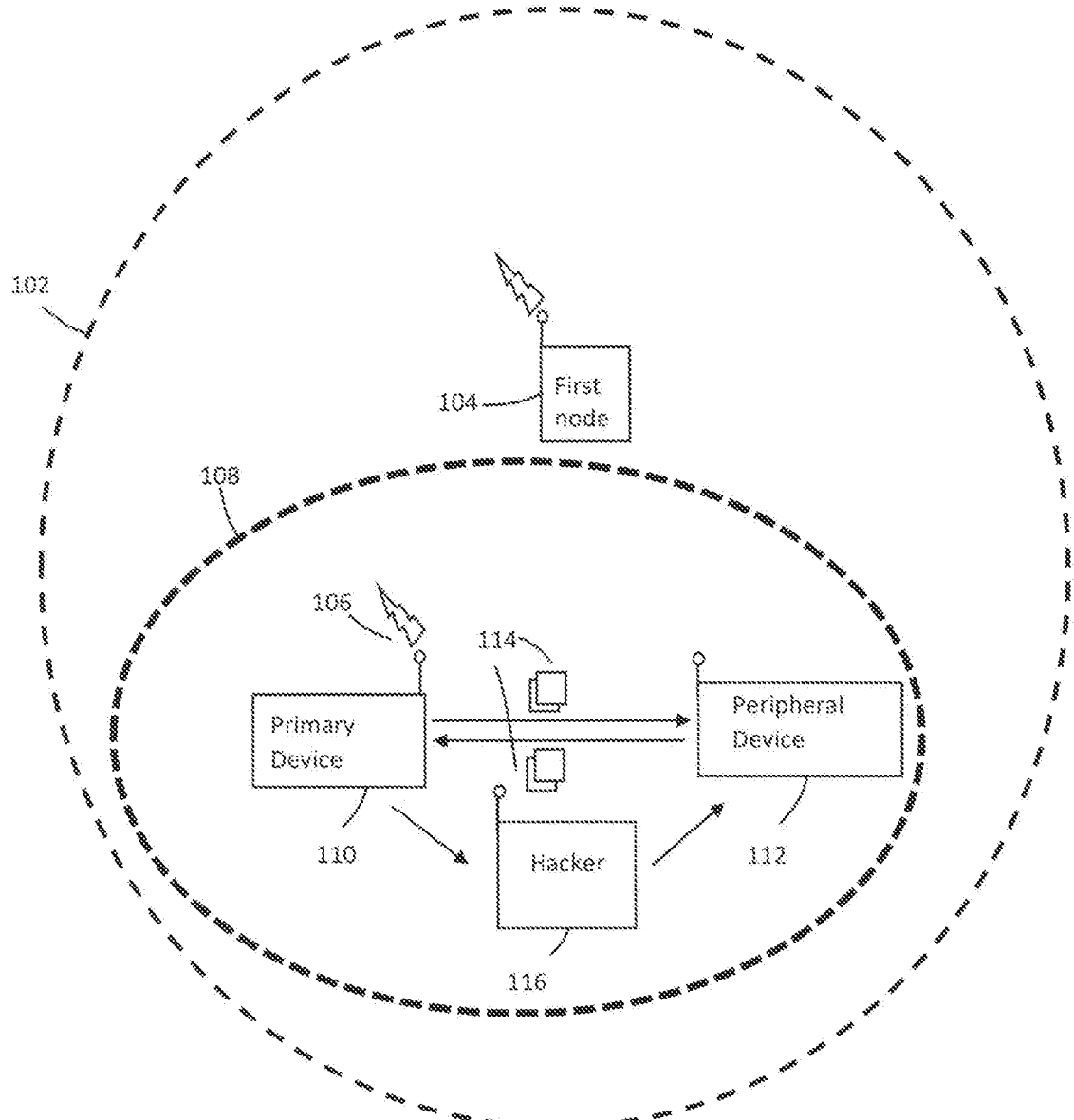
FIG. 1 illustrates an example of an eavesdropping hacking technique to hack into a BLUETOOTH data exchange.

Hereinafter, a method and apparatus for generating a non-standard preamble pattern based on a user's proximity to a network according to exemplary embodiments will be described with reference to the accompanying drawings.

In the instant specification, the term "preamble" according to certain exemplary embodiments may refer to many different types of data packet preambles, and is generally referring to data provided at the beginning of a data packet that is used to achieve certain communication functions, such as synchronization, direct current (DC) compensation, symbol timing estimation, automatic gain control (AGC) training, and other functions. According to certain exemplary embodiments disclosed herein, the preamble is illustratively shown and described as an access code preamble of a BLUETOOTH data packet. Of course, it is understood that exemplary embodiments are not limited thereto, and the scope of the exemplary embodiments may also cover preambles used in other communication technologies, including other wireless communication technologies (e.g., Wi-Fi, cellular, broadcast, Near Field Communications (NFC), etc.) as well as wired communication technologies (e.g., Ethernet, coaxial, etc.).

In the instant specification, the term "BLUETOOTH" refers to the short-range wireless communication technology that is managed by the BLUETOOTH special interest group (SIG).

In the instant specification, the term "Wi-Fi" refers to the wireless communication technology that is managed by the Wi-Fi alliance and is based on the IEEE 802.11 family of standards, including 802.11a, 802.11b, 802.11g, 802.11n, 802.11ac, 802.11ax.

As described in more detail below, a feature of certain exemplary embodiments is selectively generating a non-standard preamble pattern based on whether a user that is currently using devices communicating with each other via a first network (e.g., a BLUETOOH piconet) moves within range of a second network (e.g., a public Wi-Fi network). By generating a non-standard preamble pattern in response to detecting that a user has moved within range of the second network, the user's wireless devices can conceal the identity of the preamble to anybody within the second network that may attempt to monitor the user's data exchange in the second network, such as a hacker. Additionally, by stopping the generating of the non-standard preamble pattern in response to detecting that a user has moved out of range of the second network, any potential performance lag that might occur due to using a non-standard preamble pattern is minimized. Moreover, another aspect of certain exemplary embodiments disclosed herein provides a technique to analyze the performance of the non-standard preamble pattern during communications, to determine whether the non-standard preamble pattern is achieving certain minimum performance thresholds. Additionally, another aspect of certain exemplary embodiments disclose herein provides a technique to request a standard preamble pattern in response to determining that the non-standard preamble pattern is performing below the minimum performance thresholds. As a result, exemplary embodiments can prevent hackers from detecting a user's data packet preambles, while also striking the appropriate balance between security and performance.

Figure 2:
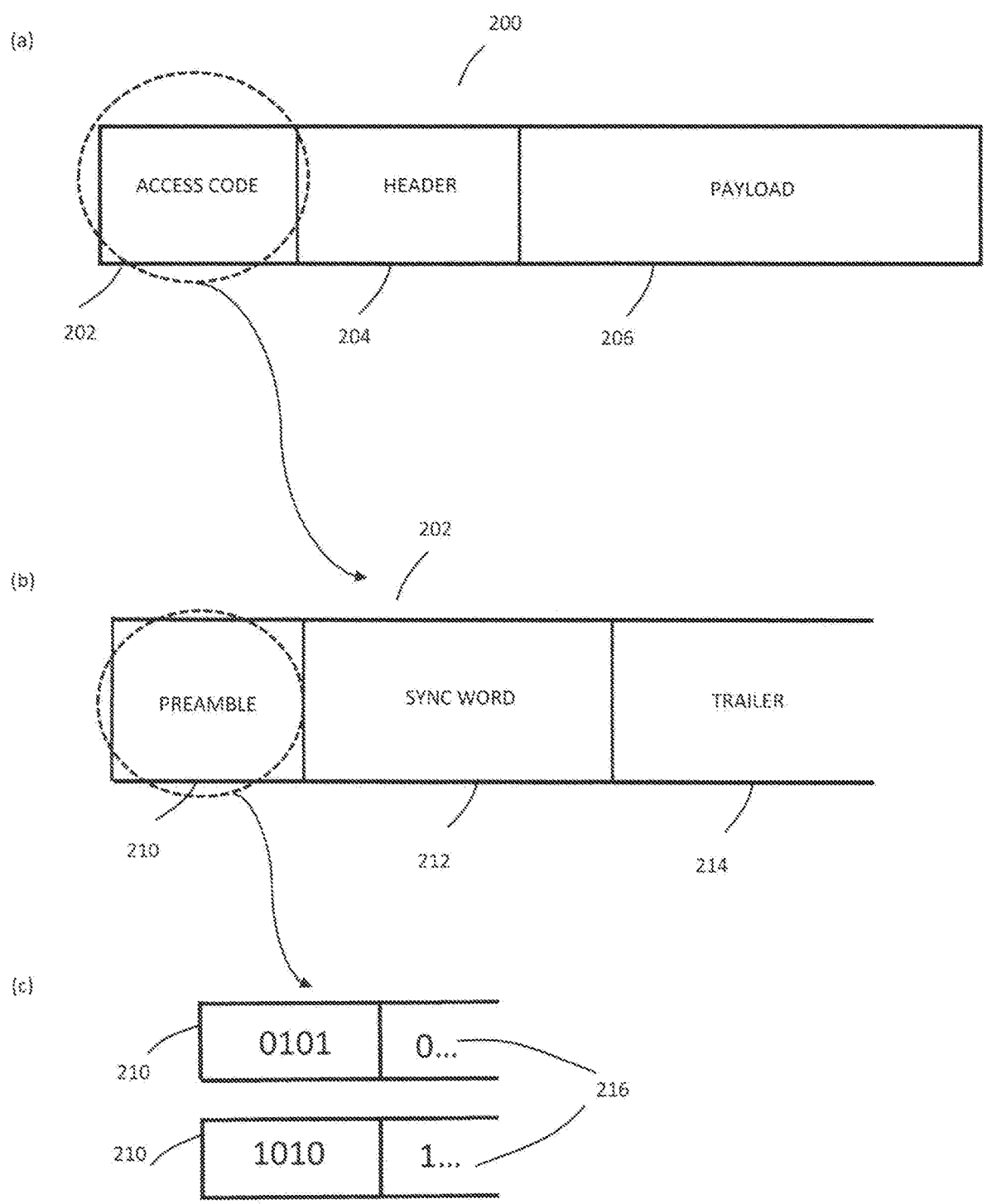
FIG. 2 illustrates an example of a BLUETOOTH Basic Rate (BR) data packet including a detailed view of the preamble.

FIG. 2 illustrates an example of a BLUETOOTH Basic Rate (BR) data packet including a detailed view of the corresponding preamble. In particular, (a) of FIG. 2 illustrates an overall view of the BLUETOOTH BR data packet structure, (b) of FIG. 2 illustrates a detailed view of the access code shown in (a) of FIG. 2, and (c) of FIG. 2 illustrates a detailed view of the preamble shown in (b) of FIG. 2.

As shown in (a) of FIG. 2, a BLUETOOTH BR data packet 200 includes an access code 202, a header 204, and a payload 206.

The access code 202 is provided at the beginning of the packet 200 and is typically used for several important communication functions, including synchronization (e.g., frequency synchronization), direct current (DC) offset compensation, and identification functions such as paging and inquiry. The access code 202 may be several different types, including a channel access code (CAC) that identifies a piconet, a device access code (DAC) that is used for paging, and an inquiry access code (IAC) that is used for inquiry messaging. The access code 202 includes a preamble 210, a sync word 212, and a trailer 214.

The header 204 is provided after the access code 202 and includes link control (LC) information including a logical transport address, packet type, flow rate, packet acknowledgment, packet numbering, and header error checking.

The payload 206 is the user information to be exchanged. For example, the payload 206 may be audio data that is generated based on a user speaking into a wireless headset that is intended to be transmitted to the user's phone and then uploaded to a cellular network, may be audio or video data that is exchanged between a user's smart phone and a car to facilitate communication or play music, may be control instructions used to control a user's security system, appliances, or other electronic devices, or may be some other form of user data altogether. Exemplary embodiments are not limited to any particular type of payload data.

As shown in (b) of FIG. 2, the access code 202 includes a preamble 210, a sync word 212, and a trailer 214.

The preamble 210 is a standardized bit pattern of alternating zeros and ones and is used for several important communication functions, including direct current (DC) compensation. In the Basic Rate (BR) implementation of BLUETOOTH, the preamble is four bits long and the transmission sequence is either "0101" or "1010", based on whether the least significant bit (LSB) 216 of the sync word 212 following the preamble 210 is "0" or "1", respectively, as shown in (c) of FIG. 2.

The sync word 212 is a 64 bit code word that ensures a large Hamming distance between different sync words and improves auto correlation properties of the access code 202 to improve timing acquisition.

The trailer 214 is provided after the sync word 212 and is a standardized four-bit pattern of either "0101" or "1010", based on whether the most significant bit (MSB) of the sync word 212 preceding the trailer 214 is "1" or "0", respectively. Along with the three MSBs of the sync word 212, the trailer 214 can also be used for extended DC compensation.

Figure 3:
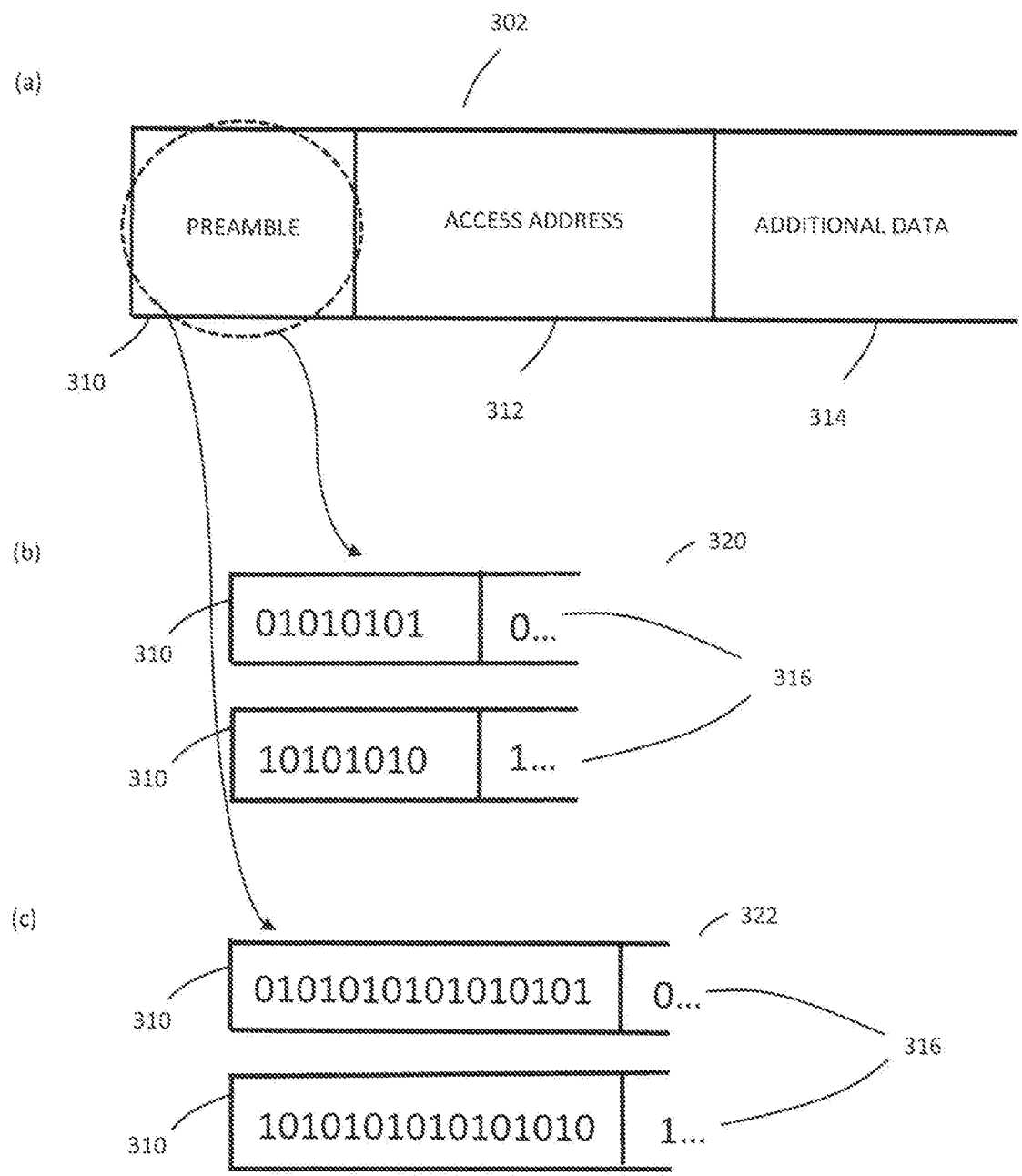
FIG. 3 illustrates a detailed view of a preamble of a BLUETOOTH Low Energy (LE) data packet.

FIG. 3 illustrates a detailed view of a preamble of a BLUETOOTH Low Energy (LE) data packet. In particular, (a) of FIG. 3 illustrates a beginning portion of a generic BLUETOOTH LE data packet, (b) of FIG. 3 illustrates a detailed view of the preamble for BLUETOOTH LE 1M data packets, and (c) of FIG. 3 illustrates a detailed view of the preamble for BLUETOOTH LE 2M data packets.

In comparison to BLUETOOTH Basic Rate (BR), BLUETOOTH Low Energy (LE) is an implementation of BLUETOOTH that is specially configured to enable slave nodes to operate for months or even years on a single small coin cell battery, based on the concept that the slave nodes enter sleep mode between transmissions, thereby conserving power. Many different products can be run on BLUETOOTH LE, such as beacons, sensors, keyboards and other peripheral devices, key fobs, automotive technology, entertainment devices, home security devices, and many others. As technology companies continue to develop products and techniques to connect electronic devices together over networks (e.g., the Internet, the Internet of Things (IoT), etc.), consumer use of Bluetooth LE is expected to grow accordingly.

As shown in (a) of FIG. 3, the beginning portion of the generic BLUETOOTH LE data packet 302 includes a preamble 310, an access address 312, and additional data 314.

The preamble 310 is a standardized bit pattern of alternating zeros and ones and is used for several important communication functions, including frequency synchronization, symbol timing estimation, and Automatic Gain Control (AGC) training.

The access address 312 is a 32 bit value that follows the preamble 310. Each link layer connection between devices, along with each periodic advertising train, has a different access address to thereby prevent collisions.

The additional data 314 can be various types of data depending on the particular BLUETOOTH LE implementation being used. For example, with respect to uncoded LE 1M packets (i.e., 1 Mb/s throughput) and uncoded LE 2M packets (i.e., 2 Mb/s throughput), the additional data 314 includes protocol data units (PDU), cyclic redundancy checks (CRCs), and optionally constant tone extensions. Further, with respect to coded LE 1M packets and coded LE 2M packets, the additional data 314 may also include coding indicators (CI) and terminator sequences (TERM) in addition to PDUs, CRCs, and constant tone extensions.

As shown in (b) of FIG. 3, for an LE 1M packet 320, the preamble 310 is eight bits long and the transmission sequence is either "01010101" or "10101010", based on whether the least significant bit (LSB) 316 of the access address 312 following the preamble 310 is "0" or "1".

As shown in (c) of FIG. 3, for an LE 2M packet 322, the preamble 310 is sixteen bits long and the transmission sequence is either "0101010101010101" or "1010101010101010", based on whether the least significant bit (LSB) 316 of the access address 316 following the preamble 310 is "0" or "1".

Figure 4:
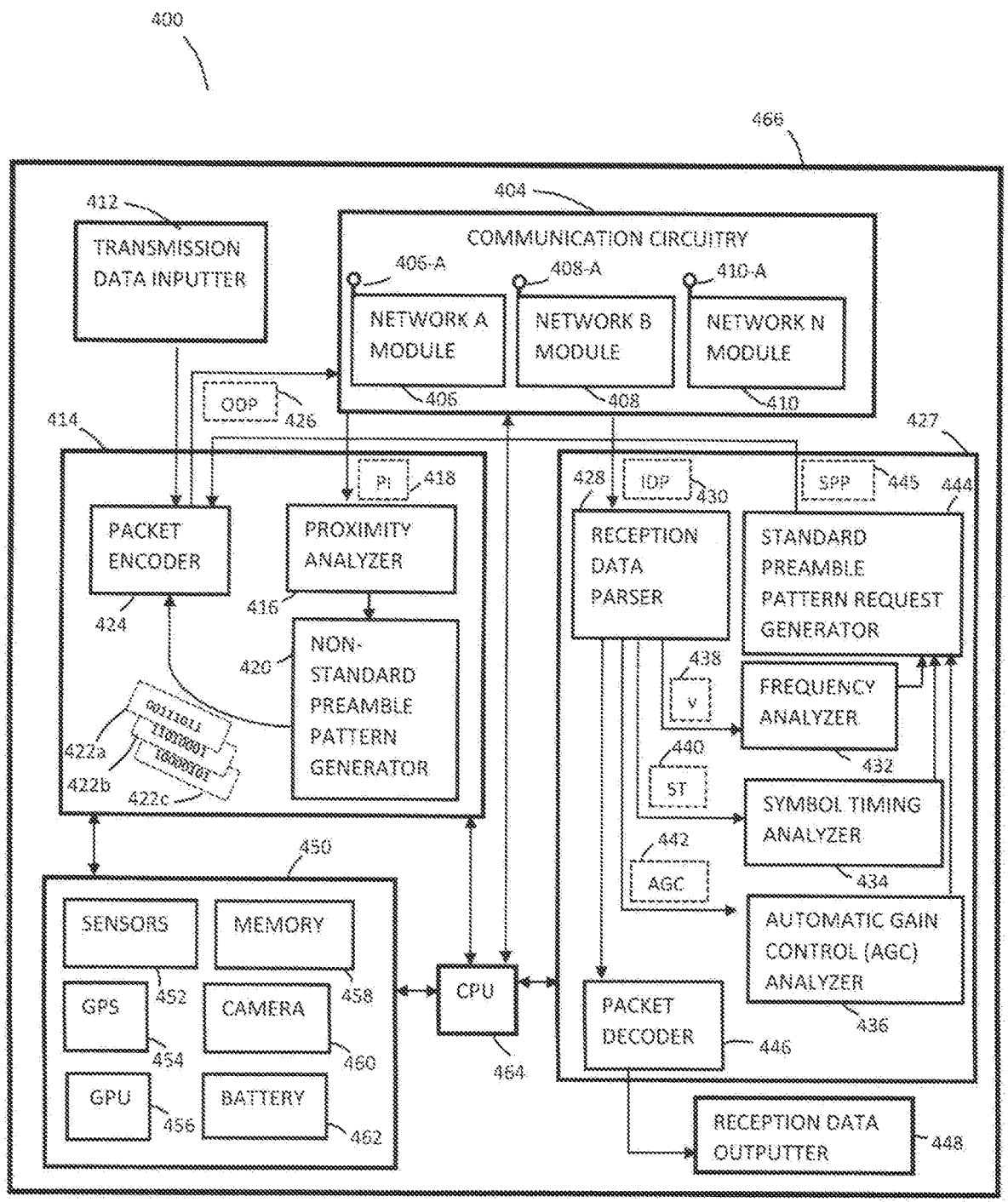
FIG. 4 illustrates a wireless apparatus according to an exemplary embodiment.

FIG. 4 illustrates a wireless apparatus according to exemplary embodiment. The wireless apparatus 400 includes communication circuitry 404 including a network A module 406, a network B module 408, and a network N module 410, a transmission data inputter 412, a transmission data generator 414 including a proximity analyzer 416, a non-standard preamble pattern generator 420, and a packet encoder 424, a reception data receiver 427 including a reception data parser 428, a frequency analyzer 432, a symbol timing analyzer 434, an automatic gain control (AGC) analyzer 436, a standard preamble pattern request generator 444, and a packet decoder 446, a reception data outputter 448, integrated hardware 450 including sensors 452, a global positioning system 454, a graphic processing unit (GPU) 456, a memory 458, a camera 460, and a battery 462, and a central processing unit (CPU) 464.

The communication circuitry 404 includes a network A module 406 having an antenna apparatus 406-A, a network B module 408 having an antenna apparatus 408-B, through a network N module 410 having an antenna apparatus 410-A, where N is any positive integer. Each of the network modules 406, 408, and 410 includes a combination of hardware and software that is specially configured to transmit and receive data according to a particular type of data telecommunications standard, e.g., BLUETOOTH, Wi-Fi, etc., using the respective antenna apparatuses 406-A, 408-A, and 410-A. According to an exemplary embodiment, the network A module 406 may be a BLUETOOTH network module, the network B module 408 may be a Wi-Fi network module, and the network N module 410 may be configured for some other type of wireless or wired communications standard (e.g., Zigbee, USB, ethernet, Thunderbolt, etc.). In this case, the network A module 406 may a chipset, system on chip (SoC), or component thereof that supports BLUETOOTH data communication, the network B module 408 may be a chipset, SoC, or component thereof that supports Wi-Fi data communication, and the network N module 410 may be hardware configured to communicate via its respective communication protocol. Of course, the communication circuitry 404 is not limited to this particular configuration, and many different configurations are possible. For example, the communication circuitry 404 may include separate network modules for different BLUETOOTH implementations (e.g., a BLUETOOTH Basic Rate (BR) network module and a BLUETOOTH Low Energy (LE) network module). Moreover, although FIG. 4 illustrates that the network modules 406, 408, and 410 are physically separated from each other, it is understood that the network modules 406, 408, and 410 may be integrated together into a single module. Additionally, certain exemplary embodiments may only use a single network module to communicate using a single data telecommunications standard, and thus do not require the multiple network modules shown in FIG. 4.

Each of the antenna apparatuses 406-A, 408-A, and 410-A includes at least one antenna configured to transmit and receive data. Also, each of the antenna apparatuses 406-A, 408-A, and 410-A may be configured as one or a plurality of multiple input, multiple output (MIMO) antenna groups. Also, exemplary embodiments are not limited to any particular configuration of antennas. For example, the antenna apparatuses 406-A, 408-A, and 410-A may be physically located inside or outside of the respective network modules 406, 408, and 410. Moreover, instead of having a dedicated antenna or group of antennas, for each network module 406, 408, and 410, the wireless apparatus 400 may have a single antenna or group of antennas that operates on behalf of all of the network modules, located anywhere throughout the physical housing 466 of the wireless apparatus 400.

The transmission data inputter 412 is a hardware component designed to receive raw transmission data input by a user into the wireless apparatus 400. For example, the transmission data inputter 412 can be a microphone, a touchscreen, a button or plurality of buttons, a keyboard, a mouse or trackball, or any other kind of device that can receive information from a user (or another device), where the information is intended to be transmitted over a network to another device or destination. The transmission data inputter 412 can be configured to receive a combination of different types of user information, including audio data (e.g., user speech), video data (e.g., user photos or videos), tactile or vibration data, touch data, movement data, etc., which may also be referred to as "raw transmission data".

The transmission data generator 414 receives the raw transmission data from the transmission data inputter 412 and generates outgoing data packets (ODP) 426 to be sent to a desired destination based on the received transmission data. The transmission data generator includes a proximity analyzer 416, a non-standard preamble pattern generator 420, and a packet encoder 424. According to an exemplary embodiment, a feature of the transmission data generator 414 is that the transmission data generator 414 can generate a non-standard preamble pattern to be inserted into the beginning of each of the ODP 426 based on whether the wireless apparatus 400 is within range of another network.

The proximity analyzer 416 is a component that detects whether the wireless apparatus 400 is within range of a network, such as a Wi-Fi network, hotspot, another user's local network, or other type of network. According to an exemplary embodiment, the proximity analyzer 416 is configured to receive proximity information ("PI") 418 and analyze the PI 418 to determine whether the wireless apparatus 400 is within range of the network. For example, the proximity analyzer 416 may be a specially configured hardware and/or software component that analyzes radio information received by the network modules 406, 408, and 410. For example, when the network module 408 is a Wi-Fi network module (e.g., Wi-Fi chipset), the network module 408 may periodically scan for a Wi-Fi network and, after each scan, generate and relay the PI 418 to the proximity analyzer 416. In this case, if the network module 408 has not detected any Wi-Fi signals during the scan period, the PI 418 indicates that no Wi-Fi signals have been detected during the scan period. Furthermore, if the network module 408 detects a Wi-Fi signal during the scan period, the PI 418 indicates that a Wi-Fi signal has been detected and may include certain details regarding the detected Wi-Fi network, such as, for example, unique identifying information of the network (e.g., network name, IP address, etc.), signal strength, and other information. Also, instead of the communication circuitry 404 transmitting the PI 418 after each scan period, the communication circuitry 404 may transmit the PI 418 only in response to detecting a Wi-Fi signal (an event-based trigger where the event is the detection of any Wi-Fi network), or according to some other triggering event. In response to the analysis of the PI 418 indicating that the wireless apparatus 400 is within range of a Wi-Fi network, the proximity analyzer 416 transmits a request to the non-standard preamble pattern generator 420 requesting the generation of a non-standard preamble pattern.

The packet encoder 424 is implemented as hardware, software, or some combination thereof and is specially configured to encode the data packets to be sent by a transmitting device. According to an exemplary embodiment, the packet encoder 424 may include a codec configured to encode data, such as a low-complexity sub-band codec (SBC), aptX, aptX low latency (LL), aptX HD, aptX Adaptive, advanced audio coding (AAC), LDAC, or some other kind of codec. The packet encoder 424 is not limited to any particular type of encoding device.

The non-standard preamble pattern generator 420 is a component that generates a non-standard preamble pattern, such as the non-standard preamble patterns 422a, 422b, and 422c shown in FIG. 4. According to an exemplary embodiment, the term "non-standard preamble pattern" refers to any preamble pattern that varies from the standard preamble pattern of alternating zeros and ones. Accordingly, the non-standard preamble pattern is not simply an alternating sequence such as "10101010" or "01010101", and instead is another sequence of bits that has at least two adjacent bits that are the same value, e.g., 00 or 11, so that the overall sequence is not the strictly alternating standard preamble sequence. Many different patterns are possible. For example, with respect to BLUETOOTH Basic Rate (BR), since the preamble is four bits long, a non-standard preamble pattern may be, for example, 0001, 0010, 0100, 1000, 0011, 0110, 1100, 0111, 1110, 1111, 0000, 1001, 1101, etc. Similar non-standard preamble patterns may be generated for each of the different BLUETOOTH implementations, including Enhanced Data Rate (EDR), Low Energy (LE), and any other BLUETOOTH standards. In the example shown in FIG. 4, the non-standard preamble patterns 422a, 422b, and 422c are BLUETOOTH LE 1M preambles and have the respective preamble sequences of 00111011, 11010001, and 10000101, although these patterns are exemplary only.

According to an exemplary embodiment, the non-standard preamble pattern generator 420 generates the non-standard pattern in response to the proximity analyzer 416 transmitting a request to generate the non-standard pattern, the request being based on the determination that the wireless apparatus 400 is within range of another wireless network. According to an exemplary embodiment, the non-standard preamble pattern generator 420 can generate the non-standard preamble pattern based on many different types of criteria, using, for example, a non-standard preamble pattern generating table shown in FIG. 5 and discussed in more detail below. For example, the non-standard preamble pattern generator 420 can vary the robustness of the security method based on factors such as the type of network detected by the proximity analyzer 416, whether the detected network is trusted, the type of application being executed by the wireless apparatus 400, and other factors. Additionally, a feature of certain exemplary embodiments is that the non-standard preamble pattern generator 420 can generate the non-standard preamble pattern based on information related to a network that the wireless apparatus 400 previously visited before the current network. There are several advantages to generating the non-standard preamble pattern based on information related to a previously visited network, including, for example, that the information related to the previously visited network is likely to be trusted by the user but unknown by a hacker in a current network, and furthermore the information related to the previously visited network changes dynamically every time a user moves into a different network, thereby enhancing security.

The wireless apparatus 400 further includes a reception data receiver 427 that includes a reception data parser 428 that receives and parses incoming data packets ("IDP") 430 to obtain frequency information, symbol timing information, and AGC information, a frequency analyzer 432 that analyzes the frequency information, a symbol timing analyzer 434 that analyzes the symbol timing information, an automatic gain control (AGC) analyzer 436 that analyzes the AGC information, a standard preamble pattern request generator 444 that selectively generates a request for a standard preamble pattern based on the analysis results, a packet decoder 446 that decodes the IDP 430, and a reception data outputter 448 that outputs the decoded IDP 430 to a user.

Generally, the preamble in BLUETOOTH data packets serves several important communication functions, including frequency synchronization, symbol timing estimation, and Automatic Gain Control (AGC) training. By employing a non-standard preamble pattern according to exemplary embodiments, the exemplary embodiments achieve a significant boost in security. On the other hand, the non-standard preamble pattern may possibly result in a slight decrease in "preamble performance", which is a term that, according to certain exemplary embodiments, refers to the degree to which the preamble is able to be used by a receiver for its intended purposes, e.g., frequency synchronization, symbol timing estimation, and/or Automatic Gain Control (AGC) training. This slight decrease in preamble performance may further depend on other factors as well, including the environment in which the wireless apparatus 400 is being used, the type of data being exchanged, etc. In particular, since the standard preamble pattern has a strictly alternating bit pattern of 0s and 1s, the standard preamble pattern maximizes a number of bit transitions in a given number of bits, which may help a receiver achieve frequency synchronization, symbol timing estimation and AGC training faster than by using a non-standard preamble pattern. Thus, a feature of the reception data receiver 427 according to an exemplary embodiment is to monitor the preamble performance of a non-standard preamble pattern, and if the preamble performance of the non-standard preamble pattern falls below a certain minimum performance threshold, to request the transmitting device to switch back to a standard preamble pattern.

The reception data parser 428 may be implemented as specially configured hardware, software, or some combination thereof that receives and parses the IDP 430 according to various criteria. According to an exemplary embodiment, the reception data parser 428 may include filters that are programmed to parse frequency information ("v") 438 of the IDP 430, symbol timing information ("ST") 440 of the IDP 430, and automatic gain control information ("AGC") 442 of the IP 430. This information may also be referred to as the non-standard preamble pattern (NSPP) performance criteria or similar terms. Once the reception data parser 428 parses the information, the reception data parser 428 then transmits the parsed information to the frequency analyzer 432, symbol timing analyzer 434, and automatic gain control (AGC) analyzer 436. The criteria and control logic that control the reception data parser 428 may be stored in the memory 458. Also, although FIG. 4 exemplarily illustrates that the reception data parser 428 parses three different types of information from the MP 430, exemplary embodiments are not limited thereto, and it is understood that the reception data parser 428 may parse less or more than three types of information from the IDP 430, and may also parse other types of information instead of or in addition to the three types of information shown in FIG. 3.

The frequency analyzer 432 receives the frequency information v 438 and determines, based on the received information, whether a non-standard preamble pattern is achieving frequency synchronization within an acceptable range, and if not, the magnitude of deviation beyond the acceptable range. Generally, frequency synchronization is important to ensure that each of the BT devices connected in a piconet hop frequencies together. Preambles may be used to help achieve frequency synchronization to thereby ensure proper frequency hopping. Accordingly, the frequency analyzer 432 according to an exemplary embodiment analyzes the frequency information v 438 to determine whether a non-standard preamble pattern is working to achieve frequency synchronization between the receiving device and the transmitting device. For example, when the wireless apparatus 400 is communicating using BLUETOOTH Basic Rate (BR), the acceptable range may be a predetermined absolute value deviation from the ideal slot timing of 625 µs, e.g., ±10 µs. In this example, if the frequency information v 438 indicates a deviation that is, for example +12 µs from the ideal slot timing, the frequency analyzer 432 determines that the non-standard preamble pattern is failing to achieve an acceptable level of frequency synchronization and further determines that the magnitude of deviation beyond the acceptable range of ±10 µs is 2 µs.

The symbol timing analyzer 434 receives the symbol timing information ST 440 and determines, based on the received information, whether a non-standard preamble pattern is achieving symbol timing within an acceptable range, and if not, the magnitude of deviation beyond the acceptable range. Generally, symbol timing is a feature of modulated telecommunications systems and is important to ensure that symbols (data) are being exchanged at the correct timing between a transmitting and receiving device. Preambles may be used to monitor and ensure proper symbol timing. Accordingly, the symbol timing analyzer 434 according to an exemplary embodiment analyzes the symbol timing information 440 to determine whether a non-standard preamble pattern is working to achieve proper symbol timing between the receiving device and the transmitting device. For example, when the wireless apparatus 400 is communicating using BLUETOOTH Basic Rate (BR), the acceptable symbol timing range may be a predetermined absolute value deviation from ideal synchronization, e.g., ±20 ppm. In this case, if the symbol timing information ST indicates a deviation that is, for example +25 ppm from ideal synchronization, the symbol timing analyzer 434 determines that the non-standard preamble pattern is failing to achieve an acceptable level of symbol timing and further determines that the magnitude of deviation beyond the acceptable range of ±20 ppm is 5 ppm.

The automatic gain control (AGC) analyzer 436 receives the AGC information 442 and determines, based on the information, whether a non-standard preamble pattern is achieving an acceptable level of automatic gain control, and if not, the magnitude of deviation beyond the acceptable range. Generally, automatic gain control is used to adjust the signal strength of a received RF signal at the receiving apparatus to ensure that the output signal level and signal-to-noise (SNR) ratio, which are used for data demodulation, stay within an acceptable range. Preambles may be used for AGC training. Accordingly, the AGC analyzer 436 according to an exemplary embodiment analyzes the AGC information 442 to determine whether a non-standard preamble pattern is enabling the receiving device to achieve an acceptable level of AGC. According to exemplary embodiments, many different types of criteria may be used to determine whether the non-standard preamble pattern is achieving an acceptable level of AGC. For example, the AGC information 442 may be used to determine whether the AGC is satisfying certain predetermined criteria such as output signal strength (dB), output signal-to-noise ratio, etc.

The standard preamble pattern request generator 444 receives the analysis results from the frequency analyzer 432, the symbol timing analyzer 434, and/or the AGC analyzer 436, determines the overall preamble performance of the non-standard preamble pattern (NSPP) based on the analysis results, and determines whether to generate a request for a standard preamble pattern (SPP) (also referred to as a standard preamble pattern (SPP) request) based on the overall preamble performance. The SPP request generator 444 may determine the NSPP preamble performance based on different combinations of the analysis results, and further based on different algorithms or criteria applied to the analysis results.

With respect to different combinations of the analysis results, the SPP request generator 444 adjusts the analysis results being considered based on numerous factors, including the type of data telecommunications standard being used to exchange data (e.g., BLUETOOTH BR, BLUETOOTH LE, Wi-Fi, etc.). In particular, certain types of data telecommunications standards, such as BLUETOOTH LE, may use preambles for frequency synchronization, symbol timing, and AGC, in which case the SPP request generator 444 will judge the preamble performance based on the analysis results of all three of the frequency analyzer 432, the symbol timing analyzer 434, and the AGC analyzer 436. Other types of data telecommunications standards, however, may not use preambles for all three of these purposes, and thus, the SPP request generator 444 can adjust the information used to judge preamble performance. For example, if a certain type of data telecommunications standard does not use preambles for AGC training, the SPP request generator 444 can disregard the AGC analysis results. Moreover, the SPP request generator 444 may also determine the preamble performance based on additional criteria instead of or in addition to than those shown in FIG. 4, such as device information, signal strength or interference, modulation information, etc.

With respect to the different algorithms or criteria applied to the analysis results, the SPP request generator 444 may, for example, determine the preamble performance based on the degree to which certain characteristics deviate from the acceptable ranges. Many different techniques are possible for determining whether preamble performance is acceptable, and exemplary embodiments are not limited to any one particular technique. For example, when the SPP request generator 444 determines preamble performance based on the analysis results from all three of the frequency analyzer 432, the symbol timing analyzer 434, and the AGC analyzer 436, the SPP request generator 444 may determine that the preamble performance of the non-standard preamble pattern is acceptable if all three of the analysis results fall within acceptable limits, or may determine that the preamble performance of the non-standard preamble pattern is acceptable if at least two of the three analysis results (e.g., frequency and symbol timing) fall within acceptable limits, even if the third analysis result (e.g., AGC) does not fall within acceptable limits. As another example, the SPP request generator 444 may determine that the preamble performance of the non-standard preamble pattern is acceptable even if none of the three analysis results fall within acceptable limits, so long as all the combined total of the magnitudes of deviation of all three analysis results does not exceed a predetermined deviation limit. As yet another example, the SPP request generator 444 may assign weights to the different preamble performance criteria to prioritize certain of the criteria. For example, if it is determined that frequency synchronization is relatively more important than symbol timing and AGC, the SPP request generator 444 may assign a weight of 1.0 to the frequency analysis results and may assign weights of 0.5 to each of the symbol timing and the AGC, and then calculate the overall preamble performance based on these weights. Many different algorithms for evaluating the non-standard preamble pattern performance criteria are possible, and exemplary embodiments are not limited to any particular method.

Based on the analysis of the non-standard preamble pattern performance criteria, the SPP request generator 444 determines whether to transmit a standard preamble pattern request ("SPP") 445 back to the transmitting device. The SPP request 445 can be many different kinds of messages and is not limited to any particular format or structure. For example, the SPP request 445 can be a stand-alone message that is generated and transmitted back to the transmitting device (e.g., on the synchronization scan channel or some other channel). Alternatively, the SPP request 445 can be information embedded within another message, such as a bit or a flag embedded within a Scan Response, Connection Response, Extended Inquiry Response message or any other type of message. In this case, for example, if the bit or flag is set to "0", then this indicates that the SPP request generator is not requesting a SPP, and if the bit or flag is set to "1", then this indicates that the SPP request generator is requesting the SPP.

Upon receiving the SPP request 445 indicating that the receiving device (e.g., the wireless apparatus 400) is requesting a SPP, the transmitting device (e.g., another device configured in the same way as the wireless apparatus 400) controls the non-standard preamble pattern generator 420 provided therein to stop generating the non-standard preamble pattern, and reverts to generating and transmitting the standard preamble pattern in the data packets. As a result, the receiving device begins receiving data packets including the standard preamble pattern. Thus, the reception data parser 428 of the receiving device stops parsing the preamble performance characteristics, and the regular procedure of using the standard preamble pattern of alternating "1" and "0" for frequency synchronization, etc. is performed. The transmitting device may continue to generate and transmit the SPP for a predetermined time period, and may also decide whether to switch back to generating the non-standard preamble pattern according to various criteria, such as if the user enters a new network. Thus, the wireless apparatus 400 according to exemplary embodiments can selectively switch back and forth between using a non-standard preamble pattern, which enhances security by encoding the preamble data format, and a standard preamble pattern, which might achieve better preamble performance depending on the situation.

The packet decoder 446 decodes the incoming data packets (IDP) 430. According to an exemplary embodiment, the packet decoder 446 may include a codec configured to decode data, such as a low-complexity sub-band codec (SBC), aptX, aptX low latency (LL), aptX HD, aptX Adaptive, advanced audio coding (AAC), LDAC, or some other kind of codec. The packet decoder 446 is limited to any particular type of decoding device.

The reception data outputter 448 receives the decoded data from the packet decoder 446 and outputs the decoded data to the user or uses the output data to control functionalities of the receiving device. According to an exemplary embodiment, the reception data outputter 448 is a hardware component such as a headset, a speaker, a screen, a processor, or any other kind of device that can output or use decoded information. The reception data outputter can be configured to output a combination of different types of user information, including audio data (e.g., user speech), video data (e.g., user photos or videos), tactile or vibration data, touch data, movement data, etc., as well as control information (e.g., information to control security systems, appliances, etc.).

The wireless apparatus 400 further includes a physical housing 466 that houses some or all of the above-described components, including, for example, the communication circuitry 404, the transmission data inputter 412, the transmission data generator 414, the reception data receiver 427, the integrated hardware 450, the CPU 464, and the reception data outputter 448. The physical housing 466 can be formed of many different types of materials, including plastic, metal, glass, rubber, or some combination thereof, and can further be formed of additional materials. Moreover, the physical housing 466 can be many different shapes, including fixed shapes such as substantially rectangular with rounded corners, as well as movable shapes such as clamshell and other shapes. Moreover, the physical housing 466 can be configured such that certain components are detachable. Also, certain components that do not require a user to have physical access thereto, such as the communication circuitry 404, may be provided completely within the housing 466, whereas other components that typically require a use to have physical access thereto, such as the transmission data inputter 412 (e.g., a touch screen, keyboard, microphone, etc.) may be provided on (e.g., partially within or connected to) the physical housing 466 without being fully encapsulated within the physical housing 466. The exemplary embodiments are not limited to any particular type of physical housing 466.

The integrated hardware 450 includes sensors 452 (e.g., touch sensors, movement sensors, etc.) to sense information, a global positioning system (GPS) 454 to determine location, a graphical processing unit (GPU) 456 to efficiently render images, a memory 458 to store user data, programs, operating systems, and many other types of information, a camera 460 to take photos and/or videos, and a battery 462 to supply power to each of the components within the wireless apparatus 400. The integrated hardware 450 shown in FIG. 4 is a non-exhaustive, exemplary group of hardware, and many other types of hardware components can be implemented in the wireless apparatus 400 instead of or in addition to those shown in FIG. 4.

In the above description of FIG. 4, it is assumed, for illustrative purposes only, that a user has two wireless devices that are each configured in the same way as the wireless apparatus 400 and thus are both capable of generating non-standard preamble patterns as well as assessing preamble performance and generating standard preamble pattern requests when appropriate. However, exemplary embodiments are not limited to such an arrangement. Certain components shown in FIG. 4 may be omitted from certain of the user's devices, and modifications may be made as well. For example, certain BLUETOOTH devices, such as audio output devices (e.g., speakers or headphones), may only be intended to receive and output data, and thus the transmission data generator 414 and all of the components provided therein could be omitted from such devices. Furthermore, other BLUETOOTH devices, such as beacons and other small components, may only be intended to transmit data, and thus, the reception data receiver 427 and all of the components provided therein could be omitted from such devices. Many different combinations of the components shown in FIG. 4 are possible according to the types of devices being used and the environment in which the devices are located, and the exemplary embodiments are not limited to the configuration shown in FIG. 4.

Figure 5:
FIG. 5 illustrates a non-standard preamble pattern (NSPP) generation table according to an exemplary embodiment.

FIG. 5 illustrates a non-standard preamble pattern (NSPP) generation table 500 according to an exemplary embodiment. According to an exemplary embodiment, the non-standard preamble pattern generation table 500 may be stored in the memory 458 and accessed by the non-standard preamble pattern generator 420 to generate a non-standard preamble pattern. As shown in FIG. 5, the NSPP generation table 500 includes a column 502 including a list of exemplary scenarios 1, 2, 3, 4, and 5, along with a column 504 including non-standard preamble pattern generation methods corresponding to the particular scenarios.

In scenario 1 of FIG. 5, no foreign network (e.g., second network) is detected. The term "foreign network" in this case refers to a network other than a network established between the user's own wireless apparatus 400 and a user's peripheral device. For example, when the user has two devices that are each configured such as the wireless apparatus 400, the user can establish a first network (a piconet network) between the two devices using BLUETOOTH, and the foreign network (second network) may be a public Wi-Fi network or some other network. Since no foreign network is detected at all, then the non-standard preamble pattern generator 420 does not generate a non-standard preamble pattern, based on the assumption that there are likely no hackers nearby.

In scenario 2 of FIG. 5, a foreign network is detected, and it is determined that the foreign network is trusted. An example of this scenario may be when a user brings the wireless device 400 into a trusted home network (e.g., the user's Wi-Fi network at home), a trusted office network (e.g., the user's Wi-Fi network at the office), a trusted friend's network, or some other trusted network. In this case, since the detected foreign network is trusted, then the non-standard preamble pattern generator 420 does not generate a non-standard preamble pattern, based on the assumption that there are likely no hackers in the user's trusted network. According to an exemplary embodiment, the process of setting a network as "trusted" can be accomplished in many different ways, including, for example, by setting the network as trusted using the transmission data inputter 412 (e.g., a touch screen or keyboard).

In scenario 3 of FIG. 5, a foreign network is detected, it is determined that the foreign network is not trusted, and the application security level is "low". An example of such a situation is when a user brings the wireless device 400 into range of a publicly accessible Wi-Fi hotspot, such as a Wi-Fi network at a STARBUCKS coffee shop, a library, a hotel, an airport, or some other place provided with a public network. Furthermore, an example of an application security level being "low" is when a user is currently executing an application on the wireless device 400 that is deemed to require a relatively low level of security, such as when a user runs a web browser to browse public sites on the World Wide Web (WWW), runs a music reproduction application to listen to music, or runs a game application to play video games. The user may customize security levels of different applications. In this case, the non-standard preamble pattern generator 420 generates a non-standard preamble pattern according to a low-security non-standard preamble pattern generation method. For example, a low-security non-standard preamble pattern generation method may be to generate the non-standard preamble pattern based on a simple technique such as using a fixed preprogrammed sequence that is distinct from a standard preamble pattern. In this case, for example, when the wireless apparatus 400 communicates with a peripheral device using BLUETOOTH Basic Rate (BR) which employs a standardized 4-bit preamble (0101 or 1010) for each packet, the fixed preprogrammed sequence may be a sequence that is stored in the wireless apparatus 400 and the peripheral device and differs from the standardized 4-bit preamble. Moreover, the stored preprogrammed sequence can be changed periodically.

In scenario 4 of FIG. 5, a foreign network is detected, it is determined that the foreign network is not trusted, and the application security level is "medium". An example of an application security level being "medium" is when a user is currently running an application on the wireless device 400 that is deemed to require a medium level of security, such as when a user uses an audio application to conduct a telephone call. In this case, the non-standard preamble pattern generator 420 generates a non-standard preamble pattern according to a medium-security non-standard preamble pattern generation method. For example, a medium-security non-standard preamble pattern generation method may be to generate a non-standard preamble pattern based on information related to a network previously accessed or visited by the wireless apparatus 400. In this case, for example, if a user of the wireless device 400 is currently using the wireless device 400 in an unsecured public Wi-Fi network and previously used the wireless device 400 in the user's home network, the non-standard preamble pattern generator 420 can generate the non-standard preamble pattern based on basic information related to the home network, such as the name of the user's home network. In this case, the non-standard preamble pattern can be generated, for example, by the non-standard preamble pattern generator 420 executing a conversion function that converts the name or part of the name of the user's home network into binary. The conversion function can be many different types known to those skilled in the art, such as Unicode, ASCII, or some other type. For example, when the wireless apparatus 400 communicates with a peripheral device using BLUETOOTH Low Energy (LE) 1M employing an 8-bit preamble for each packet, and when the user previously used the wireless device 400 in the user's home network named "HOME", the wireless apparatus 400 may, for example, employ ASCII to convert the 8-bit preamble into the ASCII Code for the first letter "H" of the home network name, which is 01001000. Alternatively, the non-standard preamble pattern generator 420 can generate the non-standard preamble pattern based on the IP address of the user's home network. For example, when the wireless apparatus 400 communicates with a peripheral device using BLUETOOTH Low Energy (LE) 1M, and when the user previously used the wireless device 400 in the user's home network named "HOME" that has an IP address of 192.168.1.102, the wireless apparatus 400 may, for example, convert the standardized 8-bit preamble into the fourth octet of the IP address, i.e., 102, which is 01100110. By doing so, the wireless apparatus 400 can use an encoding method to dynamically encode the preamble based on information of a previously visited network. Since the information of the previous network and the encoding method are known only to the wireless apparatus 400 and any associated peripheral devices, it will be extremely difficult for a hacker to detect the non-standard preamble pattern or to otherwise ascertain any meaningful information from the non-standard preamble pattern.

In scenario 5 of FIG. 5, a foreign network is detected, it is determined that the foreign network is not trusted, and the application security level is "high". An example of an application security level being "high" is when a user is currently running an application on the wireless device 400 that is deemed to require a high level of security, such as a work application, a financial application, or a file download.

In this case, the non-standard preamble pattern generator 420 generates a non-standard preamble pattern according to a high-security non-standard preamble pattern generation method. For example, a high-security non-standard preamble pattern generation method may be to use an encryption algorithm to encrypt the preamble.

According to an exemplary embodiment, the non-standard preamble pattern generation table 500 is stored in each of the user's devices so that each of the user's devices can decipher the non-standard preamble patterns. There are many different ways to store the non-standard preamble pattern generation table in the user devices. For example, when the user has a first device (e.g., wireless apparatus 400) and a second device (e.g., another wireless device configured in the same way as the wireless apparatus 400), the user can initially store the non-standard preamble pattern generation table 500 in a memory of the first device (e.g., by downloading the table 500 to the memory from the Internet or a local file), and then can transfer the stored table from the first device to the second device (e.g., by wireless or wired communication). Alternatively, the user can download the table 500 to each device independently, without requiring the first device to transfer the table to the second device. The user can further update the table 500, either automatically or manually, at various times. Moreover, the first device and the second device can communicate details to each other about the particular NSPP generation method being used during a communication session. For example, upon detecting that the first device has moved within range of a foreign untrusted network, the first device can transmit information to the second device, the information indicating that the first device is about to utilize a particular NSPP generation method of the table 500. In this case, since both the first device and the second device have the same table 500 stored therein, the second device knows the NSPP generation method identified by the first device, and thus will be able to effectively decode and decipher the non-standard preamble patterns generated by the first device. Exemplary embodiments are not limited to any particular techniques of how the first device and the second device store the table 500 or communicate details regarding the table 500.

Also, FIG. 5 illustrates an NSPP generation table 500 having a traditional "table" format including rows and columns, but this is exemplary only, and exemplary embodiments are not limited to any particular data format. For example, the wireless apparatus 500 may instead use codes, files, scripts, or any other kind of data format that can be used to associate network scenario types with NSPP generation methods.

FIG. 6 illustrates an example environment in which the wireless apparatus shown in FIG. 4 may be used, according to an exemplary embodiment. In the following description, it is assumed for illustrative purposes that the first device 400-1 is a smartphone configured in substantially the same way as the wireless apparatus 400 (FIG. 4), the second device 400-2 is a wireless headset also configured in substantially the same way as the wireless apparatus 400 and communicating with the smartphone 400-1 via BLUETOOTH LE 1M, the application being currently executed by the first device 400-1 and second device 400-2 is a wireless headset telephone application that enables the user to conduct a telephone call using the wireless headset, which is set by the user as a "medium" level security application, the first node 510 is an untrusted public Wi-Fi hotspot, and the wireless network 512 is a Wi-Fi network established by the first node 510.

As shown in (a) of FIG. 6, when the first device 400-1 and second device 400-2 are out of range of the wireless network 512, the first device 400-1 transmits a data packet 506 including a preamble 508 (along with additional data, such as that shown in FIG. 3) to the second device 504. Based on the proximity information PI 418, the first device 400-1 and second device 400-2 can determine that the first device 400-1 and the second device 400-2 are not within range of any foreign networks. Accordingly, the first device 400-1 generates the preamble 508 to have a standard preamble pattern of 01010101 and transmits the data packet 508 including the standard preamble pattern to the second device 400-2. The second device 400-2 receives the data packet 506 including the preamble 508 having the standard preamble pattern and uses the preamble 508 for communication functions, such as frequency synchronization, symbol timing estimation, and/or Automatic Gain Control (AGC) training.

As shown in (b) of FIG. 6, upon the first device 400-1 and second device 400-2 moving within range of the wireless network 512, the first device 400-1 and second device 400-2 determine, based on the proximity information PI 418, that the first device 400-1 and second device 400-2 are within range of the wireless network 512. Accordingly, the first device 400-1 accesses the non-standard preamble pattern generation table stored in the memory 458 and determines that a non-standard preamble pattern should be generated using the medium security level generation method. Then, the non-standard preamble pattern generator 420 provided in the first device 400-1 generates the NSPP using the medium security level generation method. In the present example, the medium security level generation method generates the non-standard preamble pattern based on the fourth octet of the IP address of a previously visited trusted network, e.g., a "HOME" network that has an IP address of 192.168.1.102, and thus generates a non-standard preamble pattern of 01100110. The first device 502 then transmits a data packet 516 including the non-standard preamble pattern 518 to the second device 400-2. The second device 400-2 receives the data packet 516 and uses the non-standard preamble pattern 518 for communication functions, such as frequency synchronization, symbol timing estimation, and/or Automatic Gain Control (AGC) training. Additionally, as described above with respect to FIG. 4, the second device 400-2 also determines the preamble performance of the non-standard preamble pattern 518 and generates a standard preamble pattern request if the preamble performance is unsatisfactory.

Figure 7:
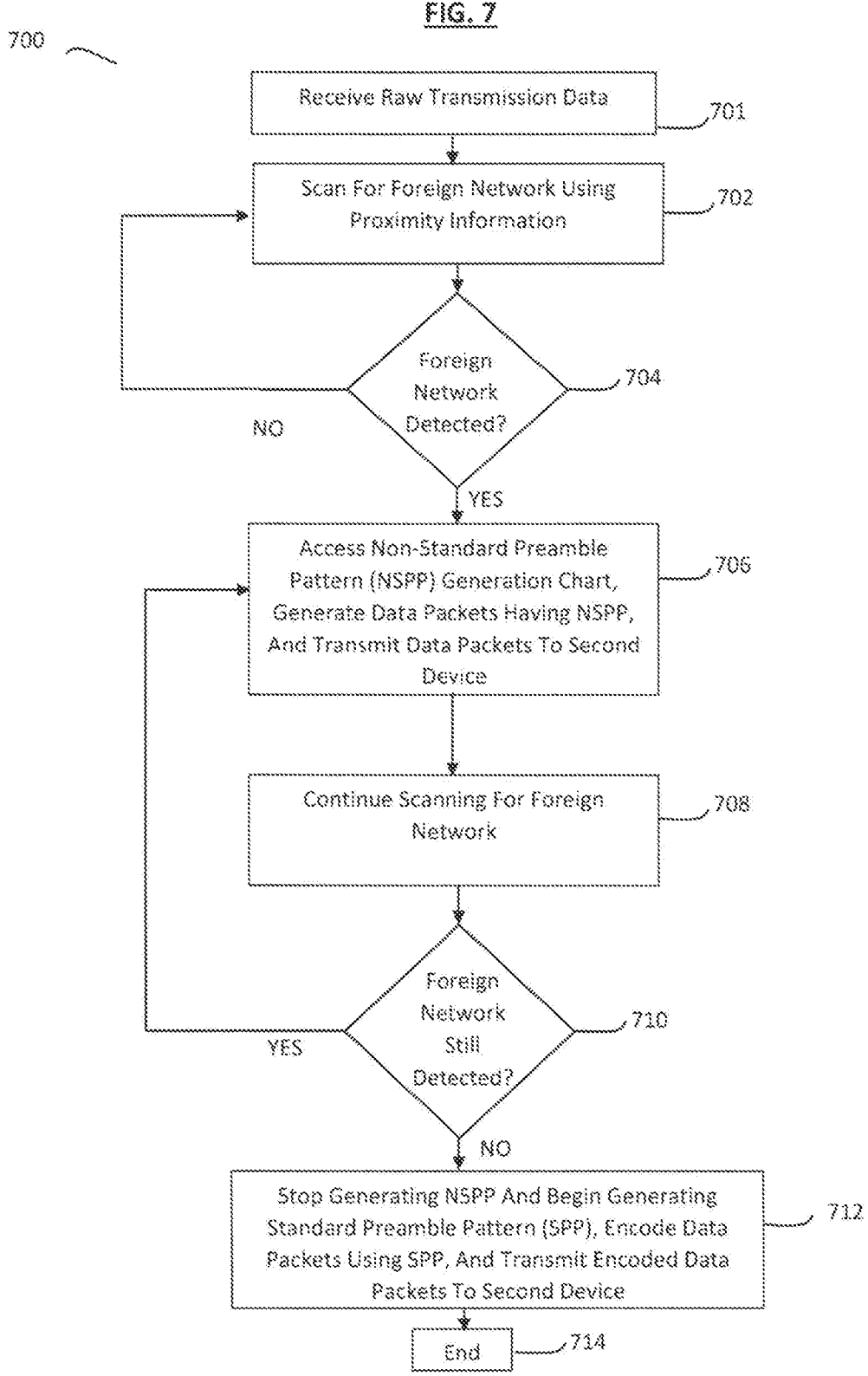
FIG. 7 illustrates a method of generating a non-standard preamble pattern according to an exemplary embodiment.

FIG. 7 illustrates a method 700 of generating a non-standard preamble pattern according to an exemplary embodiment. In the following description, it is assumed, for exemplary purposes, that the first device 400-1 shown in FIG. 6, which has the same configuration as the wireless apparatus 400 shown in FIG. 4, performs the method 700. However, exemplary embodiments are not limited thereto, and the method 700 can be performed by devices configured differently than the first device 400-1.

In operation 701, the first device receives raw transmission data from the user.

In operation 702, the first device scans for a foreign network using proximity information.

In operation 704, if the first device determines, based on the proximity information, that the first device is not within range of a foreign network ("NO"), the first device returns to operation 702 to continue scanning for foreign networks. In contrast, if the first devices detects a foreign network ("YES"), the first device analyzes the proximity information to determine details regarding the detected network, including for example, whether the foreign network is trusted or untrusted, radio signal strength of the foreign network, etc.

In operation 706, the first device accesses a non-standard preamble pattern (NSPP) generation table stored in a memory of the first device, and determines a non-standard preamble pattern generation method based on several different types of information. For example, the first device may determine the non-standard preamble pattern generation method based on whether the foreign network is trusted or untrusted and the security level of an application currently being executed by the first device. According to an exemplary embodiment, the non-standard preamble pattern generation table may be the same as the non-standard preamble pattern generation table 500 shown in FIG. 5, although exemplary embodiments are not limited thereto. Then, once the first device has selected a non-standard preamble pattern generation method using the table, the first device generates the data packets including the non-standard preamble pattern and the raw transmission data, and transmits the generated data packets to the second device. Also, although FIG. 7 exemplarily illustrates that the raw transmission data is received before the operation of accessing the NSPP generation table, it is understood that the order of operations can be reversed such that the NSPP generation table is accessed first, and the raw transmission data is received afterwards (as shown in FIG. 10).

In operation 708, the first device continues to scan for a foreign network while transmitting the data packets to the second device.

In operation 710, if the first device detects that the first device is still within range of the foreign network ("YES"), the method returns to operation 706 and the first device continues to generate data packets having non-standard preamble patterns. In contrast, if the first device detects that the first device is no longer within range of the foreign network ("NO"), the method proceeds to operation 712.

In operation 712, the first device stops generating preambles having a non-standard preamble pattern (NSPP), and begins generating preambles having standard preamble patterns (SPP). The first device then generates data packets including the standard preamble patterns, and transmits the generated data packets to the second device.

In operation 714, the process ends.

Figure 8:
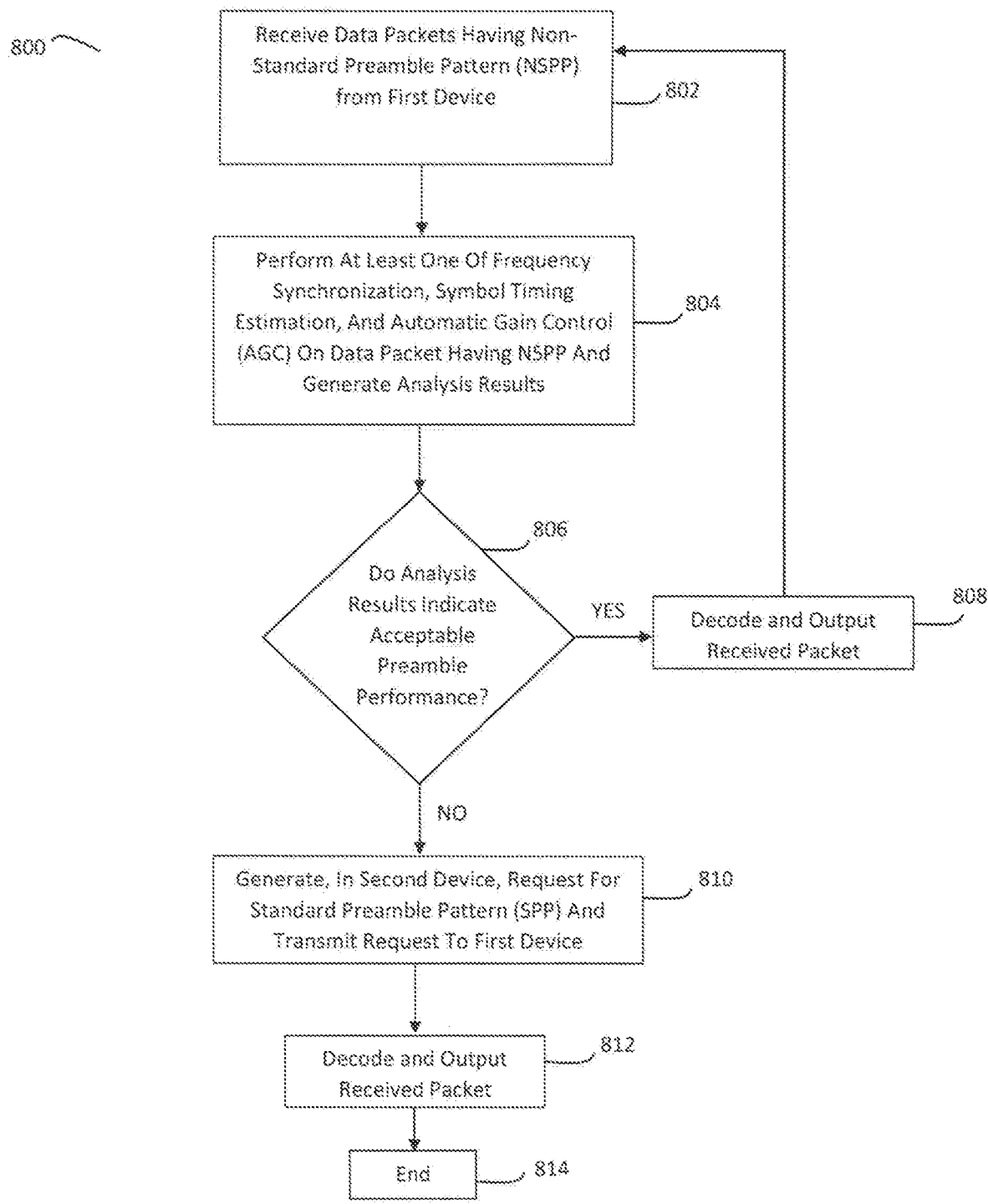
FIG. 8 illustrates a method of generating a standardized preamble pattern (SPP) request according to an exemplary embodiment.

FIG. 8 illustrates a method 800 of generating a standard preamble pattern (SPP) request according to an exemplary embodiment. In the following description, it is assumed, for exemplary purposes, that the second device 400-2 shown in FIG. 6, which has the same configuration as the wireless apparatus 400 shown in FIG. 4, performs the method 800. However, exemplary embodiments are not limited thereto, and the method 800 can be performed by devices configured differently than the second device 400-2.

In operation 802, the second device receives data packets including preambles having non-standard preamble patterns (NSPP) from the first device. For example, the first device and the second device may be located within a foreign untrusted network.

In operation 804, the second device uses the NSPP preambles to perform at least one of frequency synchronization, symbol timing estimation, and automatic gain control (AGC), and generates analysis results. For example, the second device may determine whether the frequency synchronization, symbol timing, and/or automatic gain fall within an acceptable predetermined range and, if not, may determine the magnitude of deviation beyond the acceptable range, and generate analysis results based on the determinations.

In operation 806, the second device determines whether the overall NSPP preamble performance is acceptable based on the analysis results. The second device may determine the NSPP preamble performance based on different combinations of the analysis results, and further based on different algorithms or criteria applied to the analysis results. If the second device determines in operation 806 that the preamble performance is acceptable ("YES"), then in operation 808, the second device decodes the received packet and outputs the decoded packet to the user, and then repeats operations 802, 804, and 806 so as to continue using the NSPP preambles. On the other hand, if the second device determines in operation 806 that the preamble performance is not acceptable ("NO"), then in operation 810, the second device generates a request for a standard preamble pattern (SPP) and transmits the SPP request to the first device, and in operation 812, the second device decodes the received packet and outputs the decoded packet to the user. In operation 814, the method 800 ends.

Figure 9:
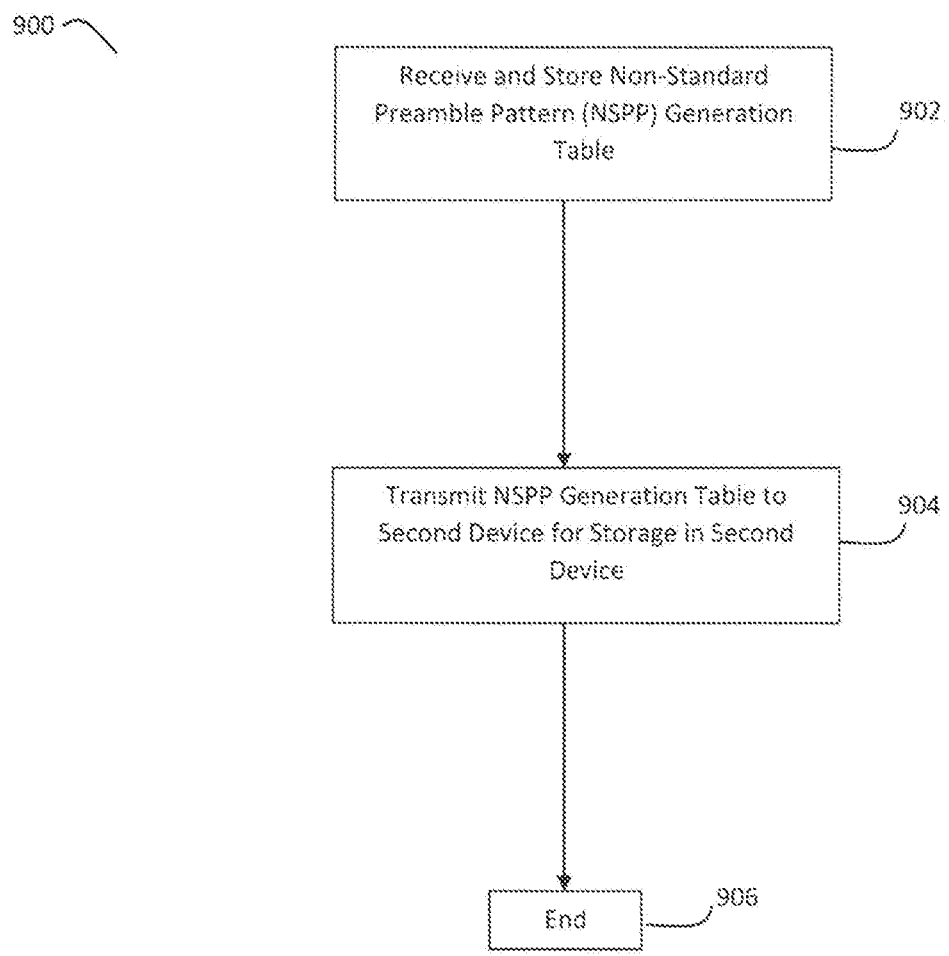
FIG. 9 illustrates a method of transmitting an NSPP generation table from a first device to a second device according to an exemplary embodiment.

FIG. 9 illustrates a method 900 of transmitting a non-standard preamble pattern (NSPP) generation table from a first device to a second device according to an exemplary embodiment. In the following description, it is assumed, for exemplary purposes, that the first device 400-1 shown in FIG. 6, which has the same configuration as the wireless apparatus 400 shown in FIG. 4, performs the method 900. However, exemplary embodiments are not limited thereto, and the method 900 can be performed by devices configured differently than the first device 400-1.

As shown in FIG. 9, initially, the first device receives and stores a non-standard preamble pattern generation table at operation 902. According to an exemplary embodiment, the non-standard preamble pattern generation table may be, for example, the same as (or similar to) the non-standard preamble pattern generation table shown in FIG. 5, although other exemplary embodiments are not limited thereto. The non-standard preamble pattern generation table may be provided to the first device in many different ways, including by transmitting the non-standard preamble pattern generation table to the first device from a source via wired or wireless transmission over a network (e.g., the Internet or a LAN), or by physically connecting an external device having the non-standard preamble pattern generation table stored therein to the first device and then transferring the non-standard preamble pattern generation table from the external device to the first device. The first device then stores the non-standard preamble pattern generation table in a memory provided within the first device. In the event that the first device has a previous version of the non-standard preamble pattern generation table already stored therein, the first device updates the previous version with the newly received version.

In operation 904, the first device transmits the NSPP generation table to the second device so that the second device can store the non-standard preamble pattern generation table. The first device can transmit the non-standard preamble pattern generation table to the second device in many different ways. For example, the first device can transmit the non-standard preamble pattern generation table to the second device via a direct wireless or wired connection to the second device, or alternatively, can transmit the non-standard preamble pattern generation table to the second device through an intermediary (e.g., a router or network node commonly connected to both the first device and the second device). Moreover, the first device can transmit the non-standard preamble pattern generation table to the second device at various timings or in response to various events. For example, the first device can transmit the non-standard preamble pattern generation table stored in the first device periodically (e.g., once every ten minutes, once every day, etc.), or can transmit the non-standard preamble pattern generation table in response to detecting that the first device and the second device are each turned on and within range of each other. Upon receiving the non-standard preamble pattern generation table from the first device, the second device stores the NSPP generation table in a memory of the second device. As a result, the first device and the second device can each use the same NSPP generation table, thereby enabling the first and second device to communicate using the non-standard preamble patterns.

In operation 906, the operation ends.

FIG. 10 illustrates a message flow 1000 in a system including the wireless apparatuses 400-1 and 400-2, which are configured in the same way as the wireless apparatus 400, according to an exemplary embodiment. As shown in FIG. 10, the message flow 1000 combines aspects of the methods 700 (FIG. 7), 800 (FIG. 8), and 900 (FIG. 9), to illustrate an example of the overall message flow in the system. Accordingly, repetitive detailed descriptions of certain operations are omitted for brevity. In the message flow shown in FIG. 10, it is assumed that both the first device 400-1 and 400-2 are turned on and have established a connection with each other (e.g., established a piconet).

In operation 1010, the first device 400-1 receives and stores a non-standard preamble pattern (NSPP) generation table 500 in a memory provided within the first device 400-1.

In operation 1012, the first device 400-1 transmits the non-standard preamble pattern generation table 500 to the second device 400-2.

In operation 1014, the second device second device 400-2 receives and stores the non-standard preamble pattern generation table 500.

In operation 1016, the first device 400-1 scans for foreign networks based on proximity information, to determine whether the first device is within range of an external network. In the present example, it is assumed that the proximity information indicates that the first device 400-1 has come within range of an external, untrusted network.

In operation 1018, the first device 400-1, in response to determining that the first device 400-1 is within range of an external network and further in response to receiving user input (e.g., raw transmission data) to be transmitted to the second device 400-2, accesses the stored NSPP generation table 500, selects the appropriate NSPP generation method, generates preambles having a non-standard preamble pattern (NSPP) according to the criteria in the NSPP table 500 and generates data packets 516 including the preambles having the NSPP.

In operation 1020, the first device 400-1 transmits the data packets 516 to the second device 400-2.

In operation 1022, the second device 400-2 receives the data packets 516 and, using the NSPP generation table 500 stored in the second device 400-2, is able to use the preambles having the non-standard preamble pattern to perform various functions, including at least one of frequency synchronization, symbol timing, or automatic gain control (AGC). Then, the second device 400-2 decodes the data packets 516 and outputs the decoded data packets to the user.

In operation 1024, the second device 400-2 analyzes the non-standard preamble pattern performance, to determine whether the preambles are achieving acceptable performance levels. For example, the second device 400-2 may analyze the performance of at least one of frequency synchronization, symbol timing, or automatic gain control. If the second device 400-2 determines that the preamble performance is acceptable, the second device 400-2 simply continues to receive and decode the data packets 516 having the non-standard preamble pattern. In the present example, however, it is assumed that the second device 400-2 determines at operation 1024 that the preamble performance is not satisfactory.

Accordingly, in operation 1026, the second device 400-2 generates a standard preamble pattern (SPP) request 445, and in operation 1028, the second device 400-2 transmits the standard preamble pattern request 445 back to the first device 400-1.

In operation 1030, the first device 400-1 receives the standard preamble pattern request 445 from the second device 400-2 and begins generating data packets 506 including preambles having a standard preamble pattern, i.e., a preamble with strictly alternating bits such as "01010101".

In operation 1032, the first device 400-1 transmits the data packets 506 to the second device 400-2.

In operation 1034, the second device 400-2 receives the data packets 506 and decodes and outputs the data packets to the user.

Thus, the message flow 1000 shown in FIG. 10 provides a technique to improve and enhance security by selectively generating and transmitting non-standard preamble patterns. Furthermore, the message flow 1000 also provides a mechanism to revert back to using standard preamble patterns in response to determining that the preamble performance of the non-standard preamble patterns is unsatisfactory. It is noted that the message flow 1000 is exemplary only, and that other operations can be performed instead of or in addition to those shown in FIG. 10. Additionally, the order of operations can be switched. For example, operation 1022 can be performed after operations 1024 and 1026, so that the second device 400-2 can determine preamble performance and request a standard preamble pattern, if necessary, before decoding and outputting any data packets. Moreover, the order of operations will change as the first device 400-1 and second device 400-2 move into and out of various foreign networks. Also, more than two user devices can be used.

FIG. 11 illustrates a method 1100 of encoding a preamble to include additional data according to another exemplary embodiment. A primary distinction between the method 1100 shown in FIG. 11 and the method shown in FIG. 7 is that, in the method 1100 shown in FIG. 11, at least a portion of the preamble is being converted to a non-standard preamble pattern in order to encode and transmit additional useful data, such as payload data, in the preamble itself. As such, the method shown in FIG. 11 uses at least a portion of the preamble for underlying data communication purposes. In the following description, it is assumed, for exemplary purposes, that the first device 400-1 shown in FIG. 6, which has the same configuration as the wireless apparatus 400 shown in FIG. 4, performs the method 1100. However, exemplary embodiments are not limited thereto, and the method 1100 can be performed by devices configured differently than the first device 400-1.

In operation 1102, the first device encodes at least a portion of a preamble to include additional data, such as payload data or other non-preamble data, and generates a data packet having the encoded preamble. For example, as described with respect to FIG. 3, when the first device 400-1 and second device 400-2 communicate using BLUETOOTH LE 2M, the preamble is sixteen bits long and the transmission sequence is either "0101010101010101" or "1010101010101010", based on whether the least significant bit (LSB) of the access address following the preamble 310 is "0" or "1". In this case, the first device may selectively use a portion of these sixteen bits to encode additional data, which is data other than that used for preamble purposes. The particular amount of preamble data to be encoded with additional data is not limited to any particular amount or ratio. Moreover, the particular encoding technique is not limited in any way, and exemplary embodiments can use a myriad of different data encoding techniques or algorithms. Furthermore, the type of data to be encoded is not limited to any particular type, and could be data indicating details regarding user payload data (e.g., raw transmission data), information regarding the inquiry, scan, or paging functions of the device(s), environmental information (e.g., temperature, humidity, brightness, movement information), device information (e.g., information regarding hardware or software of the wireless apparatus), battery information (e.g., remaining battery life), security information, or any other kind of information.

In operation 1104, the first device transmits the data packet with the encoded preamble to the second device.

In operation 1106, the method 1100 ends.

It is further noted that the method 1100 could be combined with each of the exemplary embodiments shown in FIGS. 1-10 in various ways. For example, a first portion of the preamble could have a standard preamble pattern and be used for traditional preamble purposes, a second portion of the preamble could be encoded to include additional useful information, and a third portion of the preamble could be used to communicate whether to use a non-standard preamble pattern. Moreover, the ratio of preamble data used to encode additional information, as compared to preamble data used for traditional purposes, could be adjusted based on measured preamble performance as described above in FIG. 8. Many different combinations are possible. It is noted that, since the preamble is the very first portion of the data to be transmitted and received in a data packet, the location of the preamble within the message flow is ideal to quickly communicate information before beginning other more labor-intensive data processing operations, such as decoding access codes and processing payload data. Moreover, although individual preambles may not be capable of storing significant amounts of information, it would also be possible, according to the exemplary embodiments, to spread out the additional useful data over multiple preambles. As a result, a significant amount of data could be encoded across a collective group of preambles. There are many different ways to combine the various aspects of the exemplary embodiments described herein and shown in FIGS. 1-11, and the exemplary embodiments are not limited in any sense.

It is further noted that the exemplary embodiments disclosed herein are not limited to being applied to preambles, and may alternatively or additionally be applied to other portions of a data packet, such as trailers, headers, or payload data. For example, the methods of FIGS. 7-9 could be applied to a trailer such as the trailer 214 in (b) of FIG. 2.

Aspects of the exemplary embodiments may also be embodied in a non-transitory computer readable storage medium, such as a memory device. For example, some or all of the elements included within the transmission data generator 414 and/or the reception data receiver 427 may be implemented in a non-transitory computer readable storage medium, such as RAM, SRAM, DRAM, PROM, EPROM, EEPROM, flash memory, on-chip memory, ROM, optical disc drives, cloud-based storage, and other types of non-transitory storage media. In this case, when the CPU executes the functionality of the transmission data generator 414 and/or the reception data receiver 427, the result is that the transmission data generator 414 and/or the reception data receiver 427 controls the wireless apparatus 400 to function as described above with respect to the various exemplary embodiments.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A wireless apparatus, comprising:
   a physical housing;
   communication circuitry provided in the physical housing, the communication circuitry comprising:
   a first network module comprising a first network module antenna, the first network module configured to transmit and receive, via the first network module antenna, data conforming to a first telecommunications data standard over a first network established between the wireless apparatus and another wireless apparatus, and
   a second network module comprising a second network module antenna, the second network module configured to transmit and receive, via the second network module antenna, data conforming to a second telecommunications data standard over a second network;
   a transmission data inputter provided on the physical housing, the transmission data inputter configured to receive raw transmission data input from a user; and
   a transmission data generator provided in the physical housing, the transmission data generator configured to generate data packets to be transmitted to the other wireless apparatus via the first network module based on the raw transmission data, the transmission data generator comprising:
   a proximity analyzer configured to detect whether the wireless apparatus is within range of the second network;
   a non-standard preamble pattern generator configured to selectively generate, based on whether the proximity analyzer detects that the wireless apparatus is within range of the second network, a data packet preamble having a non-standard preamble pattern in which at least two bits that are adjacent to each other within a series of bits have a same value as each other; and
   a packet encoder configured to generate the data packets including the data packet preamble having the non-standard preamble pattern and the raw transmission data, and to transfer the generated data packets to the first network module for transmission to the other wireless apparatus, wherein
   the packet encoder is further configured to generate a standard preamble pattern including a series of bits that strictly alternate in value throughout the entire preamble pattern, the non-standard preamble pattern generator generates the non-standard preamble pattern in response to detecting that the wireless apparatus is within the range of the second network, and the packet encoder generates the standard preamble pattern in response to detecting that the wireless apparatus is outside of the range of the second network.

2. The wireless apparatus according to claim 1, further comprising:

a hardware memory provided in the physical housing;

wherein the hardware memory stores a non-standard preamble pattern generation table comprising a list of scenarios regarding types of second networks and a corresponding list of non-standard preamble pattern generation techniques to be used to generate the non-standard preamble pattern, and wherein, in response to the proximity analyzer detecting that the wireless apparatus is within range of the second network, the non-standard preamble pattern generator analyzes the detected second network to determine which one of the scenarios in the non-standard preamble pattern generation table matches the detected second network, accesses the non-standard preamble pattern generation table from the hardware memory, selects a non-standard preamble pattern generation technique corresponding to the scenario matching the detected second network from among the non-standard preamble pattern generation techniques stored in the hardware memory, and generates the non-standard preamble pattern based on the selected non-standard preamble pattern generation technique.

3. The wireless apparatus according to claim 2, wherein the non-standard preamble pattern generation table includes:

a first scenario in which the detected second network is untrusted, a security level of an application being currently executed by the wireless apparatus is a low security level, and a corresponding non-standard preamble pattern generation technique is a first technique providing a first level of security;

a second scenario in which the detected second network is untrusted, the security level of the application being currently executed by the wireless apparatus is a medium security level that is higher than the low security level, and a corresponding non-standard preamble pattern generation technique is a second technique providing a second level of security higher than the first level of security; and a third scenario in which the detected second network is untrusted, the security level of the application being currently executed by the wireless apparatus is a high security level that is higher than the medium security level, and a corresponding non-standard preamble pattern generation technique is a third technique providing a third level of security higher than the second level of security.

4. The wireless apparatus according to claim 3, wherein:

the first technique uses a fixed sequence as the non-standard preamble pattern;

the second technique uses information related to a previous network visited by the wireless apparatus to generate the non-standard preamble pattern; and the third technique uses an encryption algorithm to generate the non-standard preamble pattern.

5. The wireless apparatus according to claim 1, further comprising:

a reception data receiver provided in the physical housing, the reception data receiver configured to receive reception data packets each comprising a data packet preamble having another non-standard preamble pattern from the other wireless apparatus via the first network, the reception data receiver comprising:

a reception data parser configured to parse information from the other non-standard preamble pattern;

a standard preamble pattern request generator configured to selectively generate a request which requests the other wireless apparatus to use the standard preamble pattern, based on the parsed information;

a packet decoder configured to decode the reception data packets; and a reception data outputter configured to output the decoded reception data packets.

6. The wireless apparatus according to claim 5, wherein the information parsed by the reception data parser includes at least one of frequency information, symbol timing information, and automatic gain control (AGC) information, and wherein the reception data receiver further comprises:

a frequency analyzer configured to analyze the frequency information and thereby determine whether the other non-standard preamble pattern is achieving frequency synchronization that falls within an acceptable predetermined range, and if not, to determine a magnitude of deviation of the frequency synchronization beyond the acceptable predetermined range;

a symbol timing analyzer configured to analyze the symbol timing information and thereby determine whether the other non-standard preamble pattern is achieving symbol timing that falls within an acceptable predetermined range, and if not, to determine a magnitude of deviation of the symbol timing beyond the acceptable predetermined range; and an AGC analyzer configured to analyze the AGC information and thereby determine whether the other non-standard preamble pattern is achieving symbol timing AGC that falls within an acceptable predetermined range, and if not, to determine a magnitude of deviation of the AGC beyond the acceptable predetermined range, and wherein the standard preamble pattern request generator generates the request based on analysis results from the frequency analyzer, the symbol timing analyzer, and the AGC analyzer.

7. The wireless apparatus according to claim 6, wherein the standard preamble pattern request generator assigns weights to the analysis results from the frequency analyzer, the symbol timing analyzer, and the AGC analyzer, such that at least one of the analysis results is weighted heavier than at least one other analysis result.

8. The wireless apparatus according to claim 7, wherein the first network is a BLUETOOTH piconet established between the wireless apparatus and the other wireless apparatus, and the second network is a Wi-Fi network.

9. The wireless apparatus according to claim 8, wherein the first network is a BLUETOOTH Low Energy (LE) network.

10. A method of generating a non-standard preamble pattern to be included in data packets to be transmitted from a wireless apparatus to another wireless apparatus via a first network conforming to a first telecommunications data standard, the method being performed by the wireless apparatus and comprising:

receiving, via a transmission data inputter provided on a physical housing of the wireless apparatus, raw transmission data input from a user;

detecting, via a proximity analyzer provided in the physical housing of the wireless apparatus, whether the wireless apparatus is within range of a second network conforming to a second telecommunications data standard;

selectively generating, via a non-standard preamble pattern generator provided in the physical housing, a data packet preamble having a non-standard preamble pattern in which at least two bits that are adjacent to each within a series of bits have a same value as each other, based on whether the detecting indicates that the wireless apparatus is within range of the second network; and generating, via a packet encoder provided in the physical housing, the data packets including the data packet preamble having the non-standard preamble pattern and the raw transmission data, and transmitting the generated data packets to the other wireless apparatus, wherein the selectively generating comprises:

generating, via the non-standard preamble pattern generator, the non-standard preamble pattern in response to detecting that the wireless apparatus is within the range of the second network; and generating, via the packet encoder, a standard preamble pattern including a series of bits that strictly alternate in value throughout the entire preamble pattern in response to detecting that the wireless apparatus is outside of the range of the second network.

11. The method according to claim 10, further comprising:

storing, in a hardware memory provided in the physical housing, a non-standard preamble pattern generation table comprising a list of scenarios regarding types of second networks and a corresponding list of non-standard preamble pattern generation techniques to be used to generate the non-standard preamble pattern; and in response to the detecting indicating that the wireless apparatus is within range of the second network:

analyzing the detected second network to determine which one of the scenarios in the non-standard preamble pattern generation table matches the detected second network, accessing the non-standard preamble pattern generation table from the hardware memory, selecting a non-standard preamble pattern generation technique corresponding to the scenario matching the detected second network, and generating the non-standard preamble pattern based on the selected non-standard preamble pattern generation technique.

12. The method according to claim 10, further comprising:

parsing, from reception data packets transmitted from the other wireless apparatus via the first network and each comprising a data packet preamble having another non-standard preamble pattern, information from the other non-standard preamble pattern;

selectively generating, via a standard preamble pattern request generator, a request which requests the other wireless apparatus to use the standard preamble pattern, based on the parsed information;

decoding the reception data packets; and outputting the decoded reception data packets.

13. The method according to claim 12, wherein the parsing comprises parsing at least one of frequency information, symbol timing information, and automatic gain control (AGC) information from the reception data packets, and wherein the method further comprises:

analyzing the frequency information and thereby determining whether the other non-standard preamble pattern is achieving frequency synchronization that falls within an acceptable predetermined range, and if not, determining a magnitude of deviation of the frequency synchronization beyond the acceptable predetermined range;

analyzing the symbol timing information and thereby determining whether the other non-standard preamble pattern is achieving symbol timing that falls within an acceptable predetermined range, and if not, determining a magnitude of deviation of the symbol timing beyond the acceptable predetermined range;

analyzing the AGC information and thereby determining whether the other non-standard preamble pattern is achieving AGC that falls within an acceptable predetermined range, and if not, determining a magnitude of deviation of the AGC beyond the acceptable predetermined range; and generating the request based on the analyzing of the frequency information, the symbol timing information, and the AGC information.

14. The method according to claim 13, further comprising assigning weights to analysis results from the analyzing of the frequency information, the symbol timing information, and the AGC information, such that at least one of the analysis results is weighted heavier than at least one other result.

15. The method according to claim 14, wherein the first network is a BLUETOOTH piconet established between the wireless apparatus and the other wireless apparatus, and the second network is a Wi-Fi network.

16. The method according to claim 15, wherein the first network is a BLUETOOTH Low Energy (LE) network.

* * * * *